(12) United States Patent
Tayebi et al.

(10) Patent No.: US 6,373,827 B1
(45) Date of Patent: *Apr. 16, 2002

(54) WIRELESS MULTIMEDIA CARRIER SYSTEM

(75) Inventors: Masood K. Tayebi; Baya Hatim; Saeid Safavi; Chi Nche; Ismail Lakkis; Cathal O'Scolai; Deirdre O'Shea; Joseph J. Roy; Ulun Karacaoglu; Hoang Xuan Bui, all of San Diego, CA (US)

(73) Assignee: Wireless Facilities, Inc., San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,217

(22) Filed: Oct. 20, 1997

(51) Int. Cl.[7] .................................................. H04B 7/00
(52) U.S. Cl. ........................................ 370/310; 370/465
(58) Field of Search ............................... 370/347, 342, 370/335, 337, 320, 321, 365, 466, 467, 465, 310, 315, 316, 327, 324

(56) References Cited

U.S. PATENT DOCUMENTS

| | | | |
|---|---|---|---|
| 4,764,941 A | 8/1988 | Choi | 375/112 |
| 4,860,283 A | 8/1989 | Takano et al. | 370/82 |
| 5,067,126 A | 11/1991 | Moore | 370/112 |
| 5,181,225 A | 1/1993 | Neeser et al. | 375/1 |
| 5,355,402 A | 10/1994 | Weis et al. | 379/61 |
| 5,373,502 A | 12/1994 | Turban | 370/18 |
| 5,410,754 A * | 4/1995 | Klotzbach et al. | 370/468 |
| 5,483,531 A * | 1/1996 | Jouin et al. | 370/465 |
| 5,511,068 A | 4/1996 | Sato | 370/18 |
| 5,533,013 A | 7/1996 | Leppanen | 370/18 |
| 5,546,381 A | 8/1996 | Fukushima | 370/18 |
| 5,568,472 A | 10/1996 | Umeda et al. | 370/18 |
| 5,633,876 A * | 5/1997 | Dinkins | 370/349 |
| 5,640,386 A * | 6/1997 | Wiedeman | 370/320 |
| 5,764,700 A * | 6/1998 | Makinen | 375/272 |
| 5,812,541 A * | 9/1998 | Fuentes et al. | 370/335 |
| 5,883,884 A * | 3/1999 | Atkinson | 370/279 |
| 5,903,573 A * | 5/1999 | Wolf | 370/535 |
| 5,926,479 A * | 7/1999 | Baran | 370/252 |
| 5,978,688 A * | 11/1999 | Mullins et al. | 455/557 |
| 6,011,785 A * | 1/2000 | Carney et al. | 370/330 |
| 6,064,649 A * | 5/2000 | Johnston | 370/232 |
| 6,081,536 A * | 6/2000 | Gorsuch et al. | 370/468 |
| 6,097,733 A * | 8/2000 | Basu et al. | 370/468 |
| 6,144,859 A * | 11/2000 | Ladue | 455/511 |

FOREIGN PATENT DOCUMENTS

| | | |
|---|---|---|
| EP | 0 682 416 A3 | 11/1995 |
| EP | 0 682 416 A2 | 11/1995 |
| GB | 2 213 025 A | 8/1989 |
| WO | WO 96/13948 | 5/1996 |

\* cited by examiner

*Primary Examiner*—Ajit Patel
(74) *Attorney, Agent, or Firm*—Knobbe, Martens, Olson & Bear, LLP

(57) ABSTRACT

A system and method for communication of radio frequency (RF) signals over multimedia signal paths. The invention provides a wireless multimedia carrier (WMC) system capable of receiving a variety of standardized input signals, such as DS0/E0, T1/E1, T2/E2, and/or T3/E3 for transmission using RF channels. The WMC system selectively employs time division multiple access (TDMA) and/or code division multiple access (CDMA) technology. The WMC system transmits the various signal inputs using RF carriers, receives the transmitted signals, and converts the signals to the desired signaling scheme (standard) for forwarding to intended destinations.

22 Claims, 15 Drawing Sheets

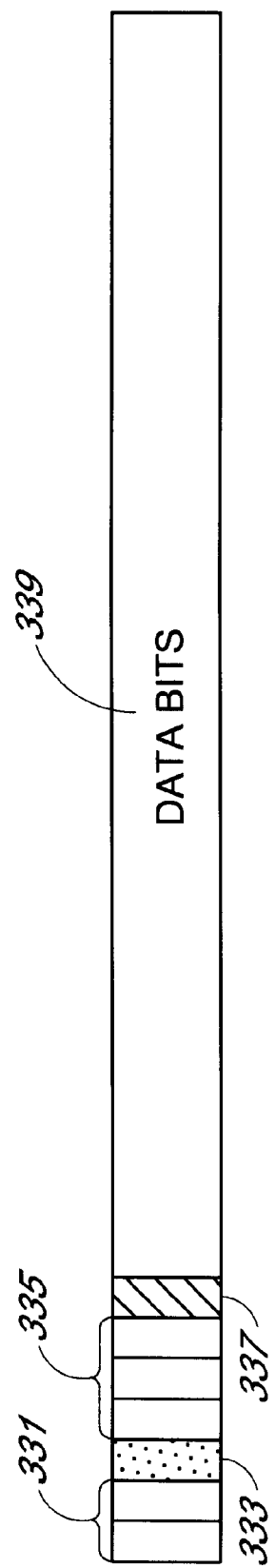

WIRELESS MULTIMEDIA CARRIER SYSTEM

BACKGROUND OF THE INVENTION

1. Field of the Invention

The invention relates generally to telecommunication systems. More particularly, this invention relates to full-duplex transmission and reception of voice, data, and image signals over multiple communication media.

2. Background of the Related Technology

T-carrier systems have become an essential part of modern telecommunications systems. A T-carrier system is found in every telephone company in North America. A T-carrier allows for transmission of one or more telephone calls or data connections by modem. The basic unit of signaling is DS0, followed by progressively higher speed signaling rates. First generation T-carrier systems, called T1, which carry Digital Signal Level 1 (DS1), employ a full duplex all-digital service. The digital stream is capable of carrying standard 64 kilobits per second (kbps) channels in which 24 channels are multiplexed to create an aggregate of 1.536 Mega bits per second (Mbps). Time division multiplexing (TDM) allows a channel to use one of 24 timeslots. More particularly, the 24 channels are time-division multiplexed into a frame to be carried along the data stream line. Typically, each frame contains one sample of 8 bits from each of the channels, and a framing bit. This structure results in a frame having 193 bits. In view of employing pulse code modulation (PCM) on each channel, there are 8000 frames per second. Hence, a frame is 125 microseconds long. Eight kbps of overhead bits are added (due to framing) to 1.536 Mbps, thereby yielding an aggregate of 1.544 Mbps.

A T1 system employs Alternate Mark Inversion (AMI) coding to reduce the required bandwidth of 1.5 MHz by a factor of two. The transmission is byte-synchronous whereby timing synchronization for each channel is derived from the pulses that appear within the samples (8 bits in each sample). This timing keeps everything in sequence. Although, a T1 system employs generically 24 channels of 64 kbps data plus 8 kbps of overhead (sometimes referred to as channelized service), the multiplexing equipment may be configured in other ways. For example, T1 may be used for a single channel of 1.536 Mbps, two high-speed data channels at 384 kbps each, and a video channel at 768 kbps. In short, a T1 system service does not have to be channelized into 24 timeslots. It can be split into any number of usable data streams.

T1-systems may multiplex T1 signals into a T2 (DS2) system, but with additional framing bits and 4 times the data rate. This results in an aggregate data rate of 6.312 Mbps. Similarly, a T3 digital link comprises a multiplexing of 7 T2 links (and additional framing bits), resulting in a data rate of 44.736 Mbps. The T3 system has greater demand in high capacity applications.

The E carrier services are the European equivalents of the T-carrier. The following table contrasts the various T and E carrier systems in terms of their TDMA structure and data rates.

| Carrier | TDMA Structure | Data rate |
| --- | --- | --- |
| DS0 | 8 bits/125 μsec | 64 kbps |
| T1, DS1 | 24 DS0 + 1 Framing bit = (24 × 8 + 1) bits/125 μsec | 1.544 Mbps |
| T2, DS2 | 4 DS1 + 17 Framing bits = (4 × 193 + 17) bits/125 μsec | 6.312 Mbps |
| T3, DS3 | 7 DS2 + 69 Framing bits = (7 × 789 + 69) bits/125 μsec | 44.736 Mbps |
| E0 | N/A | 64 kbps |
| E1 | 30 E0 + Framing Bits | 2.048 Mbps |
| E2 | 4 E1 + Framing Bits | 8.448 Mbps |
| E3 | 4 E2 + Framing bits | 34.368 Mbps |

Due to the considerable cost associated with wiring and line amplifiers, there has been an increasing need for wireless implementation of T/E-carrier technology. To meet this need, initially infrared laser-based T1/T2 systems were developed. Since no licensing is required, the system may be placed in service as soon as it is installed. In addition, the implementation cost requires no major towers, power equipments, cable entrances or other similar construction equipment. Typical applications of such cordless T1/T2 links are digital PBX to PBX connection (using a quad T1), video conferencing using a channel capacity of 6 Mbps, or four 1.544 Mbps systems having a compressed video standard. However, the infrared laser technology has a number of disadvantages, such as limited range (up to 1.5 miles), concern over the use of a laser in an office environment, atmospheric disturbances, etc.

One limitation of conventional T/E carrier systems for synchronization between the transmitter and the receiver is that they use framing overhead bits on successive frames. More particularly, frames are sent sequentially to ensure synchronization. Furthermore, initial T/E systems are used to reduce the number of voice frequency cable pairs needed for interconnecting telephone offices. Many of these cable pairs do not support long links, and are not cost efficient. More importantly, there are technical complications associated with the T/E systems as they became more widely deployed. One major complication is that the speech coding is inadequate for providing proper transmission quality to create long-distance circuits. To prevent this problem, the number of T systems in series has to be limited to three, which substantially complicates network provisioning and circuit planning.

In view of the foregoing, there is a need in the industry for a new system and method of implementing T/E systems which extends the coverage area in a wireless communication environment without the disadvantages of conventional methods. The new system and method should enable compensation for transmitting and receiving frequency variations, synchronization at the receiver and provision of a virtual signaling channel. These systems should expand coverage areas while maintaining minimal channel inter-cell interference or congestion. Furthermore, such system should be easy to install and maintain. Moreover, the system should support communication for mountainous region extension, urban links between separate facilities, over water extension, site interconnections of cellular networks, building-to-building LAN extensions, PBX, FAX and data extensions, and community networks.

SUMMARY OF THE INVENTION

To overcome the problems associated with the related technology, the invention provides a system and method of communicating voice, data, and image signals over multimedia signal paths transparently. A wireless transceiver station (WTS) is provided to communicate signals from inputs having various standardized signaling schemes to outputs having a single signaling scheme. The various standardized inputs include signals conforming to the DS0, T1/E1, T2/E2, and T3/E3 signaling standards ("signaling schemes"). The outputs of the WTS system generate signals for transmission over one of a variety of selectable transmission media such as the ISM, NII, and PCS bands, for reception by another WTS system at a distant site. At the distant WTS site, the received signals are amplified and processed back to their original, or other selectable, standardized signaling scheme. The processed signals are then forwarded to their intended destinations. Using the WTS system, the intelligence and signaling scheme of the signals are preserved.

According to one embodiment of the invention, a wireless multimedia carrier (WMC) system comprises two or more WTS systems. Each WTS comprises three main subsystems. These subsystems include a radio frequency (RF) system, an intermediate frequency (IF) system, and a baseband/digital signal processing (Baseband) system. One WTS is designated as a local WTS receiving signals having a standardized telephonic signaling scheme (e.g., T3/E3) from a local communication facility. The local WTS converts the standardized telephonic signaling scheme to a RF signaling scheme, and transmits RF signals having the RF signaling scheme to another WTS. The RF signaling scheme includes applying a signal access method such as TDMA and/or CDMA. Another WTS is designated as a distant WTS receiving the RF signals from the local WTS. The distant WTS converts the RF signaling scheme to the standardized telephonic signaling scheme.

BRIEF DESCRIPTION OF THE DRAWINGS

The above and other aspects, features and advantages of the invention will be better understood by referring to the following detailed description of the preferred embodiment, which should be read in conjunction with the accompanying drawings, in which:

FIG. 5b is a frame structure as processed by the Framer and Signaling Controller of the TX and RX Baseband systems.

DETAILED DESCRIPTION OF THE PREFERRED EMBODIMENTS

A detailed description of the invention is provided below. As a particular embodiment of the invention, the following description is not intended to limit the enumerated claims, but to serve as a particular example thereof. The following description is divided into four sections. The first section provides an overview of the wireless multimedia carrier (WMC) system. The second section provides an overview of one embodiment of the wireless transceiver station (WTS) system as implemented in the WMC system. The third section provides a detailed description of one embodiment of the Transmitter of the WTS system. The fourth section provides a detailed description of one embodiment of the Receiver of the WTS system.

1. Wireless Multimedia Carrier System Overview

The invention provides a communication system for the transmission and reception of signals having standardized signaling schemes over multimedia signal paths. A wireless multimedia carrier (WMC) system is provided for this purpose. The WMC system supports a variety of standardized systems, e.g., T-carrier systems, using wireless radio frequency links (point-to-point, point-to-multipoint, and multipoint-to-point), such as radio in the local loop (RLL). Such application have been facilitated by using spread spectrum technology and the recent release of the Industrial, Scientific and Medical (ISM) bands by the Federal Communications Commission (FCC). The ISM bands include 900 MHz (902–928 MHz), 2.4 GHz (2400–2483.5 MHz), and 5.7 GHz (5725–5850 MHz).

Figure 1:
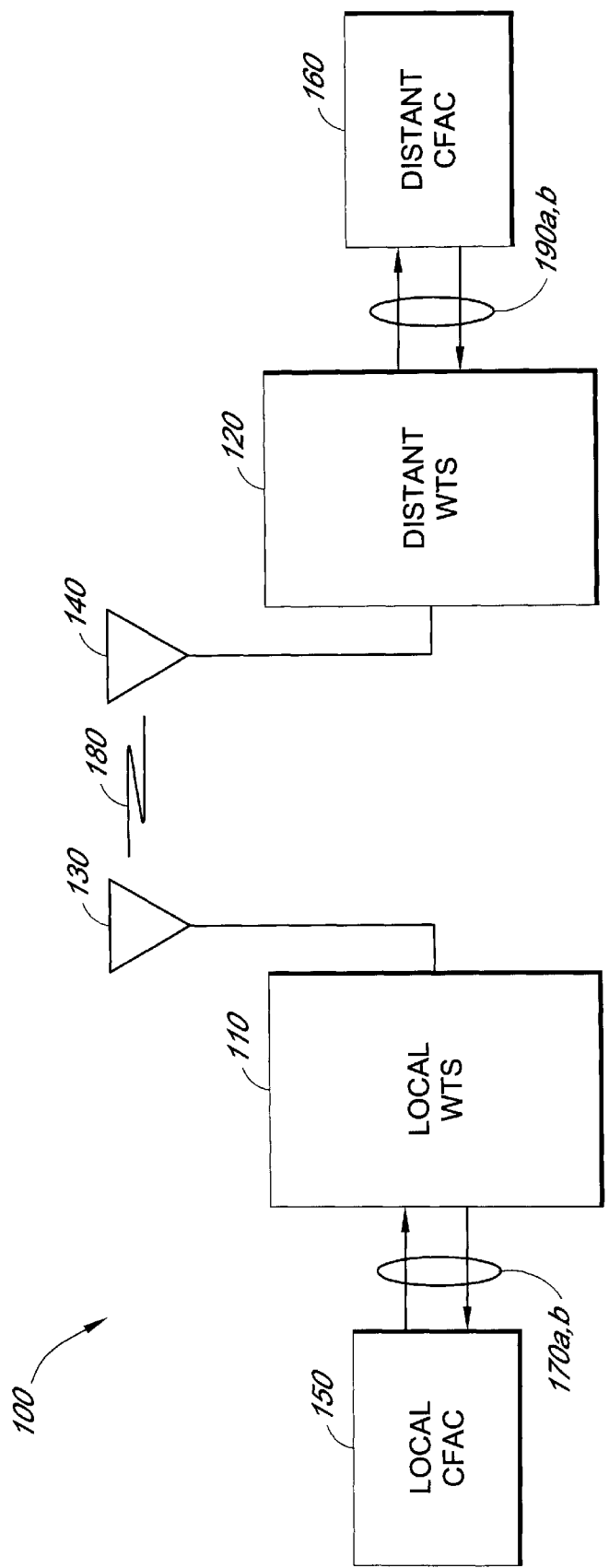
FIG. 1 is a functional block diagram of an exemplary link using the wireless multimedia carrier (WMC) system as implemented in one embodiment of the invention.

As shown in FIG. 1, a WMC system 100 comprises two or more wireless transceiver stations (WTSs) 110 and 120. The WTS systems 110, 120 include antennas 130 and 140, respectively, for transmitting and receiving RF signals wirelessly. In this embodiment, the WTS 110 is often referred to as the local WTS (LWTS), and the WTS 120 is referred to as the distant WTS (DWTS). A local communication facility (LCFAC) 150 is connected to the LWTS 110 at the local site. A distant communication facility (DCFAC) 160 is connected to the DWTS 120 at the distant site.

The LCFAC 150 and DCFAC 160 (collectively the "COMFACs") may each be embodied as a wired or wireless, private or public, communication facility such as a cellular/mobile telephone station, public switched telephone network, local area network (LAN), a wide area network (WAN), or any other similar communication network. Each COMFAC represents the facilities at which signal re-transmission to a distant site over the WMC system 100 is desired. Each of the LWTS 110 and the DWTS 120 (collectively the "WTSs") is a transceiver system supporting full-duplex transmission and reception of radio frequency (RF) signals in several bands in the RF spectrum including, without limitation, PCS, ISM, NII, and cellular bands. The WTSs function in more than one band concurrently. More particularly, a transmitting WTS typically transmits outgoing signals to a plurality of distant WTSs using one or more RF bands simultaneously (i.e., point-to-multipoint communication). Additionally, a receiving WTS typically receives incoming signals from a plurality of distant WTSs using one or more RF bands simultaneously (i.e., multipoint-to-point communication). Finally, each WTS may be configured to receive signals having multiple signaling schemes from a variety of standard sources for transmission and reception simultaneously. Typically, each of the antennas 130, 140 is an omni-directional antenna or, for longer communication range, a directional antenna capable of providing sufficient signal power in various bands of the RF spectrum.

In the forward link, the LCFAC 150 feeds standardized input signals 170a into the LWTS 110 for transmission to a distant site. The standardized input signals 170a conform to one or more of a variety of standardized telecommunications signaling schemes including DS0/E0, T1/E1, T2/E2, and T3/E3. The LWTS 110 receives, processes and transmits the input signals 170a to DWTS 120 via the antenna 130 over a RF link 180. At the distant site, the DWTS 120 receives the signals via the antenna 140. The DWTS 120 processes and restores the signals to their initial standardized signaling scheme, i.e., DS0/E0, T1/E1, T2/E2, or T3/E3. The DWTS 120 then forwards the received signals 190a to the intended DCFAC 160.

In the reverse link, the DCFAC 160 feeds standardized input signals 190b into the DWTS 120 for transmission to the local site. As noted above, the standardized input signals 190b conform to a variety of signal standards including DS0, T1/E1, T2/E2, and T3/E3. The DWTS 120 receives, processes and transmits the input signals 190b to DWTS 110 via the antenna 140 over the RF link 180. At the local site, the LWTS 110 receives the signals via the antenna 130. The LWTS 110 processes and restores the signals to their initial standardized signaling scheme, e.g., DS0/E0, T1/E1, T2/E2, or T3/E3. The LWTS 110 then forwards the received signals 170b to the intended LCFAC 150.

2. Wireless Transceiver Station Overview

Figure 2:
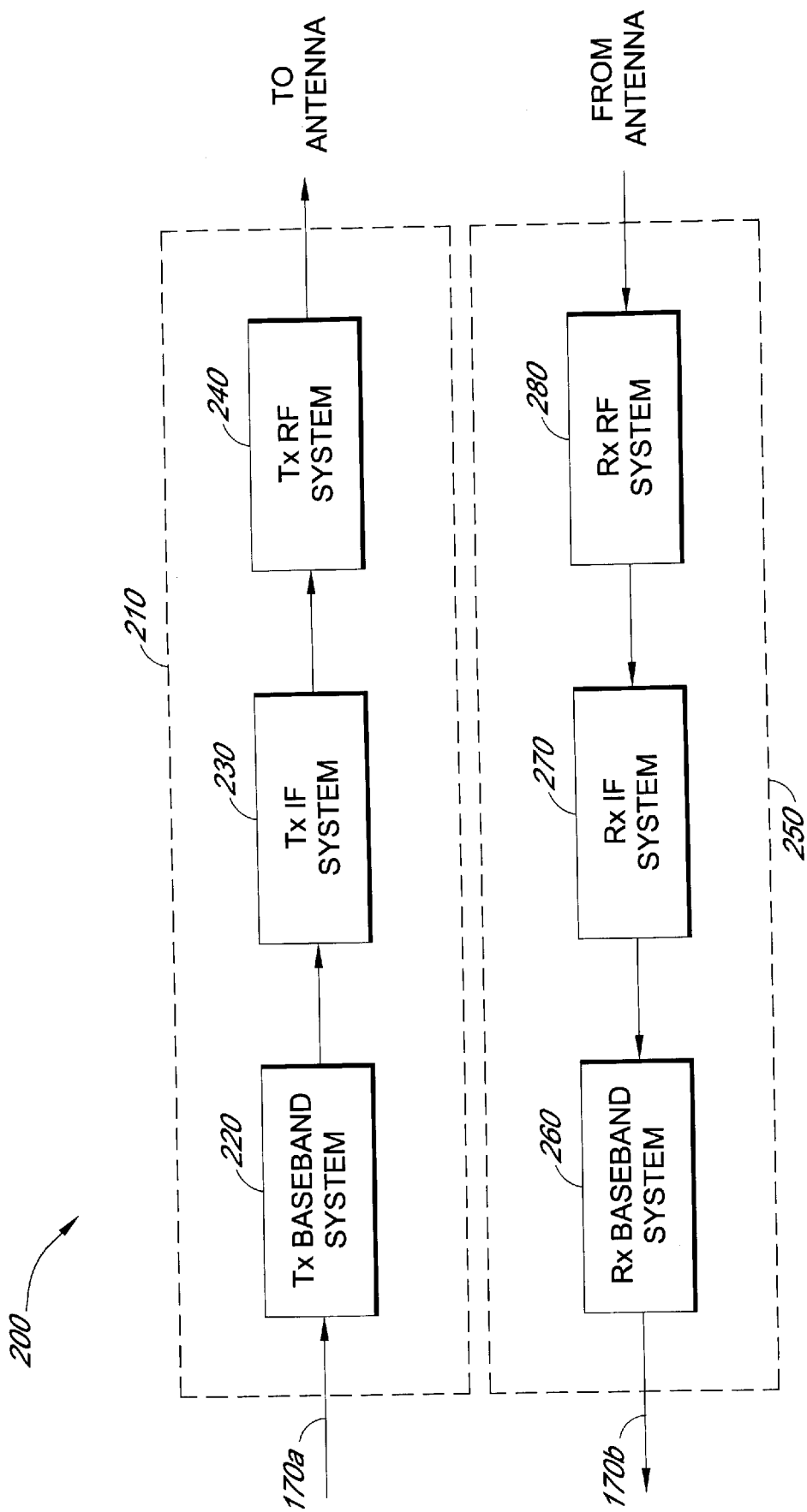
FIG. 2 is a functional block diagram of an exemplary wireless transceiver station (WTS) system as implemented in the WMC system of FIG. 1.

FIG. 2 illustrates a functional block diagram of an exemplary WTS system 200. The WTS system 200 may process data signals using time division multiple access (TDMA) and/or code division multiple access (CDMA) techniques. The TDMA technique results in the generation of parallel signal components which are combined for transmission in the available bandwidth. There are two methods of signal spreading/despreading techniques used when applying CDMA to the data signals. The first technique is based upon parallel spreading/despreading of a data signal using a bank of predetermined orthogonal pseudorandom noise (PN) code. With this technique, incoming data signals are extracted from parallel channels after undergoing despreading at the receiving end. Synchronization and data detection are preferably performed separately on each channel. The second technique employs a single code to spread outgoing data signals. This technique combines the spread signal components with a time delay (e.g., one or more chip per successive channel) before transmission. As is well known in the art, a chip refers to the length of time a data stream occupies a carrier frequency. With this technique, the spread signals are preferably despread from parallel channels using a filter matched to the spreading code followed by a sidelobe suppression filter (e.g., Barker code). More particularly, the combination of pulse shaping, matched filter and sidelobe suppression filter results in a TDMA signal at a rate substantially equal to each parallel data rate times the processing gain (i. e. the same rate as the spread data on each parallel channel). Synchronization of frame, timing, phase, and frequency of data signals is then performed once on the TDMA data stream.

The WTS system 200 is one embodiment of the WTSs 110, 120 of the WMC system 100 shown in FIG. 1. As shown in FIG. 2, the WTS system 200 comprises a Transmitter 210 and Receiver 250, each divided into three main subsystems. The Transmitter 210 comprises a TX baseband/digital signal processing (Baseband) system 220 for receiving outgoing signals 170a from the LCFAC 150 (shown in FIG. 1). Additionally, a TX intermediate frequency (IF) system 230 is connected to the TX Baseband system 220 to receive the outgoing signals 170a for further processing. Finally, a TX radio frequency (RF) system 240 is connected to the TX IF system 230 for transmitting the outgoing signals 170a to a distant site.

Similarly, the Receiver 250 comprises a RX Baseband system 260 for receiving incoming signals 190b from a distant site. Additionally, a RX IF system 270 is connected to the RX Baseband system 260 to receive the incoming signals 190b for further processing. Finally, a RX RF system 280 is connected to the RX IF system 270 to receive and forward the incoming signals 190b to the LCFAC 150. The description of these subsystems in connection with the Transmitter 210 is provided first and, then, the description of these subsystems in connection with the Receiver 250 is provided second.

3. Transmitter of the Wireless Transceiver System

Figure 3:
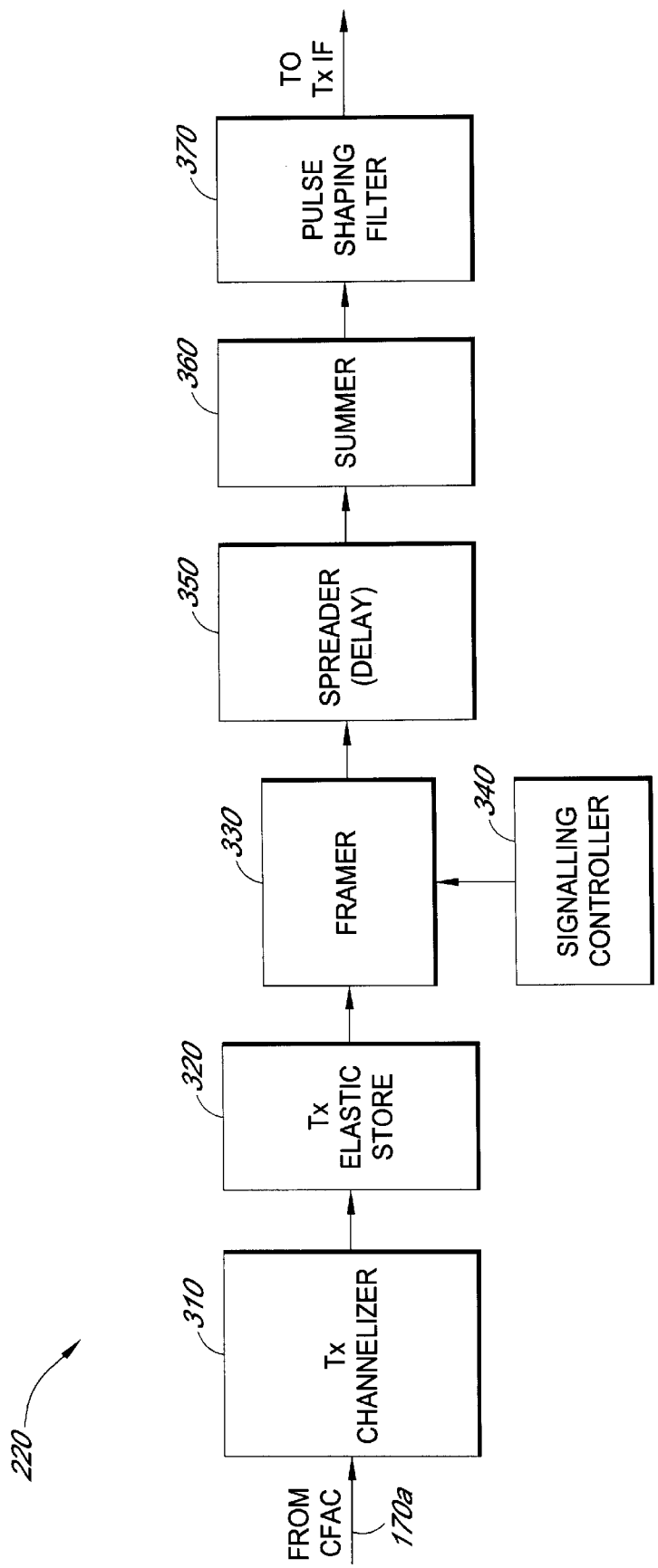
FIG. 3 is a functional block diagram of the TX Baseband system as implemented in the transmitter system of the WTS system of FIG. 2.

FIG. 3 is a functional block diagram of one embodiment of the TX Baseband system 220 as implemented in the Transmitter 210 of the WTS system 200. In the forward link (i.e., the transmit mode), input signals 170a are fed into a Channelizer 310 of the Baseband system 220. As noted above, the input signals 170a may virtually be any standardized signal such as DS0/E0, T1/E1, T2/E2, T3/E3, Ethernet (LAN/WAN), intranet, or Internet signals. For this embodiment, it is assumed that the input signals 170a are either multiple T1/E1 channels or a single T3/E3 channel. The Transmitter 210 is characterized by a parallel structure for processing data extracted synchronously at substantially the same rate of a T1 (E1) channel. These signals are typically obtained from a communication facility (CFAC) 150 (shown in FIG. 1). The CFAC 150 is preferably located proximate to the WTS system 200. In general, the Channelizer 310 demultiplexes the input signals 170a if necessary, and transmits these signals 170a to an Elastic Store 320.

The Elastic Store 320 operates as a buffer for the signals 170a thereby allowing the average data rate of its input and output to be substantially the same. The Elastic Store 320 is connected to a Framer 330. The Framer 330 compensates for transmit frequency variations in the outgoing signals 170a. A Signaling Controller 340, connected to the Framer 330, provides a virtual signaling channel for system alarms and status. If frequency spreading is being applied to the signal, the Framer 330 feeds the signals 170a to a Spreader 350 to combine a spreading code with (i.e., CDMA technique) on the framed signal. A Summer 360, connected to the Spreader 350, performs a summing operation on all spread signals. The Summer 360 feeds the spread signals into a TX Pulse Shaping Filter (PSF) 370 to filter out and minimize inter-chip interference of the spread signals. The PSF 370 feeds the signals into the TX/IF system 230 for further processing. The outgoing signals are preferably divided into a set of I-channels and a set of Q-channels prior to delivery to the TX/IF system 230 (FIG. 2).

Figure 4:
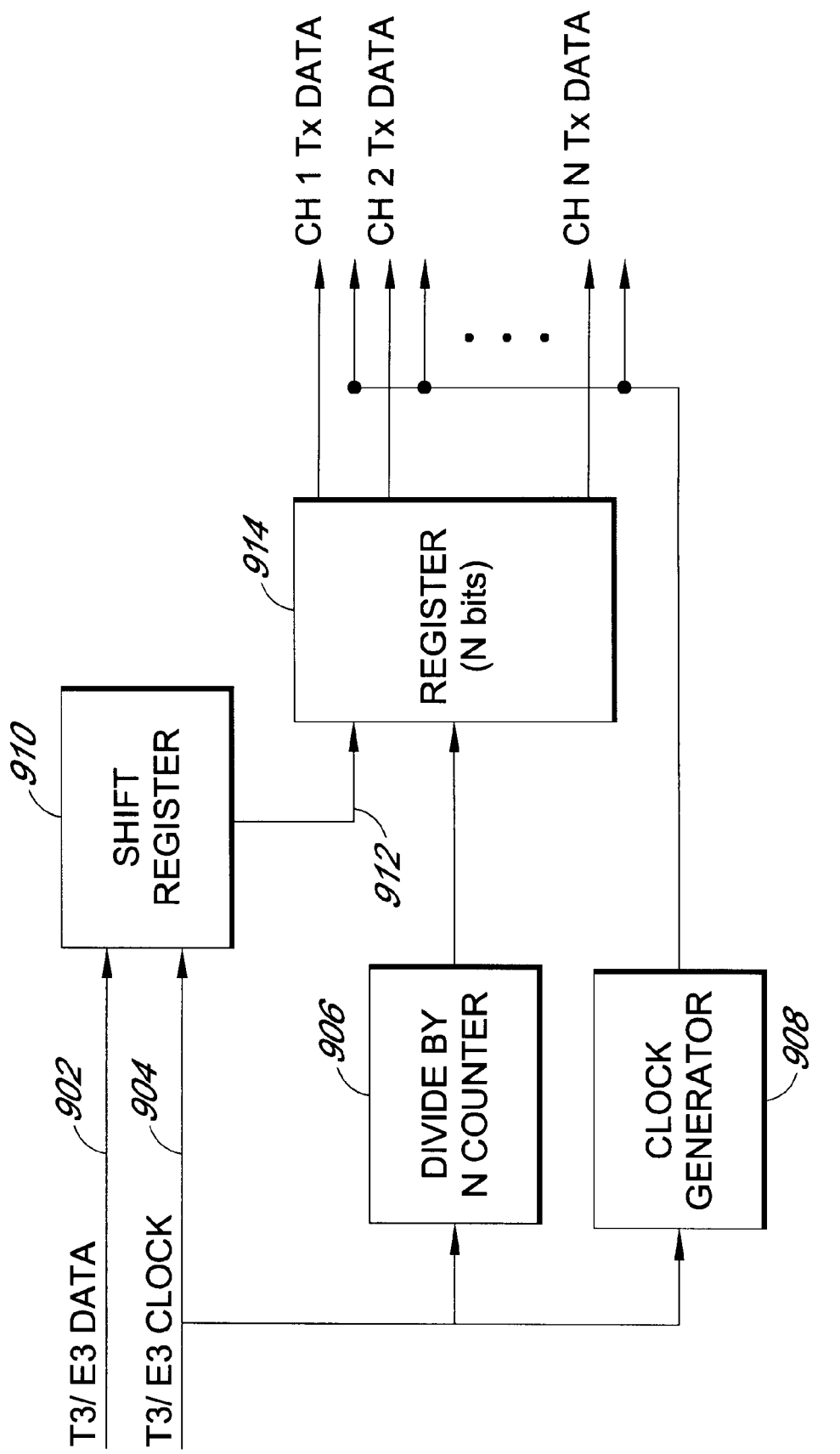
FIG. 4 is a functional block diagram of the TX Channelizer as implemented in the TX Baseband system of FIG. 3.

FIG. 4 is a functional block diagram of the TX Channelizer 310 as implemented in the TX Baseband system 220 of the WTS system 200. The Channelizer 310 communicates the outgoing signal 170*a* to the TX Elastic Store 320. The Channelizer 310 accepts multiple T1 inputs or a single T3/E3 input. In the case of a single T3/E3 input, the Channelizer 310 demultiplexes a single T3/E3 input into 28 T1 signals. In that case, the TX Channelizer 310 preferably separates the 28 T1 signals into a set of 14 in-phase (I) channels and a set of 14 quadrature (Q) channels. In case of multiple T1 inputs, the Channelizer 310 does not process the input signals 170*a*. Rather, the Channelizer 320 sends a write-request signal to the Elastic Store 320 and, after affirmative acknowledgment, forwards the input signal to the Elastic Store 320.

The outgoing signal (e.g., T3/E3) typically comprises a data signal 902 and a clock signal 904. The Channelizer 310 comprises an N Counter 906 and a Clock Generator 908, each receiving the clock signal 904. The N Counter 906 constructs N transmit data streams from a T3/E3 data signal (i.e., data signal 902). The Channelizer 310 further comprises a shift register 910 for converting the data signal 902 from parallel to serial data streams. The shift register 910 receives a single T3/E3 data signal 902 using the clock signal 904. The shift register 910 feeds its output signals 912 into a data register 914. The shift register 910 is parallel loaded into the data register 914. For instance, when T3/E3 signals are fed into the shift register 910, the T3/E3 signals are shifted and clocked by the Clock signal 904 to be fed into the Shift Register 910. The data register 914 is an N-bit register which outputs N TX data channels. T1/E1/DS0 data and clock signals are respectively applied directly to channel TX data and clock inputs of the TX Elastic Store 320.

The TX Elastic Store 320 (shown in FIG. 3) is preferably a shift register buffer which provides data buffering of input signals to produce output signals having a data rate slightly different from that of the input signals. The Elastic Store 320 receives input signals from the Channelizer 310 and feeds its output into the Framer 330 (shown in FIG. 3). Upon system initialization, the Elastic Store 320 enters a Start state. A reset process is triggered upon powering up the system, or after performing a manual reset operation. During this process, several system tasks are executed simultaneously. Some of these tasks include performing a clear operation on a variety of control signals such as a Write_Request sampling and process registers, Detect_Write_Request and process registers, Write_Semaphore and process registers, Read_Request sampling and process registers, Detect_Read_Request and process registers, Read_Semaphore and process registers, Buffer_Update and process registers, and finally clearing a receiver dejitter circuit and process registers. Once these tasks have been completed, the Elastic Store 320 enters the Start state. One or more address pointers are used to indicate the current position of the buffer. The pointer's value varies from 0 to A, where A is the length of the buffer.

The TX Channelizer 310 transmits a Write_Request signal to the TX Elastic Store 320 in which case data signals are stored in the Elastic Store 320 and an address pointer is decremented. If the Channelizer 310 transmits another Write_Request signal, the Elastic Store 320 carries out the same procedure (i.e., stores data signals and decrements the address pointer accordingly). If the TX Framer 330 transmits a Read_Request signal to the Elastic Store 320, then the Elastic Store 320 outputs data signals to the Framer 330, and increments the address pointer accordingly. If no read/write signals are received by the Elastic Store 320, the Elastic Store 320 remains in an idle state. If the address pointer reaches a predetermined level (e.g., 8), the Elastic Store 320 sends a Stuff_Request signal to the Framer 330. Bit stuffing allows reading and writing of data signals without causing an underflow or overflow condition in the Elastic Store 320. A clock edge preferably mediates all these signal transitions. The read, write, and stuff signals may be transmitted on separate signal lines (not shown in this figure). The read, write, and stuff decisions are preferably monitored by an arbitration controller (not shown in this figure) within the Elastic Store 320.

Figure 5A:
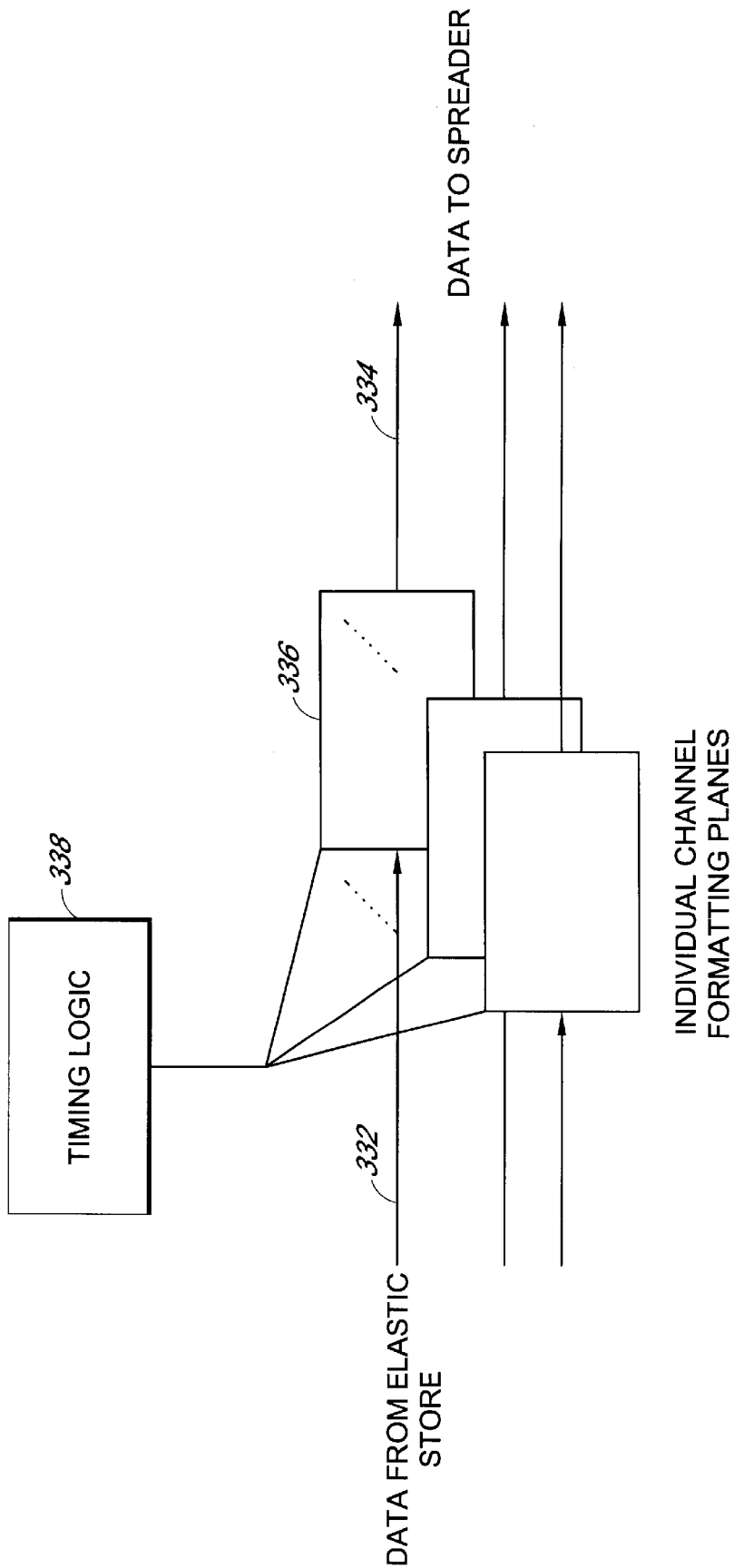
FIG. 5a is a functional block diagram of the channel formatting planes of the TX Framer as implemented in the TX Baseband system of FIG. 3.

As noted above, the Framer 330 receives outgoing data signals from the TX Elastic Store 320 and outputs these signals to the TX Spreader 350. FIG. 5*a* shows a functional block diagram of the channel formatting planes of the Framer 330. As shown in FIG. 5*a*, each channel containing data signals 332 is fed into an individual channel formatting plane 336 in the Framer 330. The Framer 330 processes these data streams and produces respective data channels 334 to be fed into the Spreader 350. The Framer 330 adds one or more overhead bits to each data stream 332. The Framer 320 compensates for transmitting and receiving frequency variations by implementing stuffing and synchronization techniques during the receive stage. Additionally, the Signaling Controller 340 functions in conjunction with the Framer 330 to provide a virtual signaling channel for system alarms and status. The Framer 330 provides a frame structure to the outgoing data signals. The Framer 330 preferably employs this framing process synchronously on all channels using a common clock signal.

FIG. 5*b* shows a frame structure as processed by the Framer 330 and Signaling Controller 340 of the TX Baseband system 220 (FIG. 3). The overhead bits added by the Framer 330 typically comprise a frame preamble 331 (e.g., 2 bits), a signaling bit 333 (e.g., 1 bit), justify bits 335 (e.g., 3 bits), and a stuff bit 337 (e.g., 1 bit). Data bits 339 of the data signal 332 follow the overhead bits in the frame. The preamble bits are preferably constructed using a Barker Code sequence which is transmitted in parallel across each channel using bits 1 and 2 of the frame. The Barker Code is preferably loaded into one or more preamble registers (not shown in this figure) by initiating a Reset after system power-on. A subsequent Reset re-loads the preamble registers. The loading operation into the preamble registers occupies about 1 transmit clock cycle (i.e., a Reset signal is held in the high logical state). The preamble bits are transmitted simultaneously (i.e., in parallel) across all data channels 334. In this embodiment, since each frame contains two preamble bits, the total number of preamble bits equals the number of frames (channels) multiplied by 2 bits/frame.

The signaling bit is generally used for signaling activity at three main levels. The first level of signaling occurs between functional elements within the Transmitter 210 or Receiver 220 systems. The second level of signaling occurs at the system level (e.g., between the Transmitter 210 and the Receiver 220). The third level of signaling occurs at the end-to-end level (e.g., between a LWTS and a DWTS over the air link). For example, Channel 0 is used to carry the signaling information, while all other channels may use a dummy signaling bit (e.g., set to "1"). Hence, if the system operator desires to inquire about the overflow/underflow status of the Elastic Store 320, a signaling bit is used to request such status information from the Elastic Store 320 with the system microcontroller (not shown in this figure). This arrangement provides an adequate signaling rate for the types of messages which need to be sent. Typically, the message sent across the signaling bus (i.e., Channel 0) comprises a message preamble (e.g., 3 bits), a channel number (e.g., 5 bits), a message category (e.g., 3 bits), a message type (e.g., 5 bits), and other similar information elements if applicable. Although any channel may be used as a signaling bus, in this embodiment, Channel 0 is designated as the signaling bus. There are three main categories of messages: Call Establishment, Call Clearing, and Other Messages. For Call Establishment category, the message type includes set-up request, set-up acknowledgment, connect, and connect acknowledgment. For Call Clearing category, the message type includes release, release complete, restart, and restart acknowledgment. For Other Messages category, the message type includes status request (status and alarms), notify (status and alarms), and information. Accordingly, a typical message may look as follows:

Message=Preamble+Channel_Number+Category+Message_Type+IE where Preamble represents the preamble bits, Channel_Number represents the channel number being used, Category represents the message category (e.g., call establishment), Message_Type represents the message type (e.g., set-up acknowledgment), and IE represents other information elements being sent. In this embodiment, bits 5–7 are designated for IE. Five bits are designated to represent the channel number to allow a maximum number of 32 channels. In asynchronous communication, the message preamble alerts the receiving unit that a message is being transmitted. In a message block, bits 13–15 are designated as the message preamble. The bits 13–15 are set to "111" to indicate that a message is being transmitted. If no message is being sent, then the signaling bit in the frame is set to "0". The signaling is carried out on the virtual channel (e.g., Channel 0) thereby requiring a channel number (especially in case of errors over one specific channel). Bits 8–12 are designated as the channel number. When the 8–12 bits are set to "11111," a global alarm is indicated to all channels. A global alarm is may be recognized by all functional elements in the WTS system 200 (FIG. 2). A specially designated microcontroller (e.g., a Hitachi H9/3048) typically manages and controls the occurrence of a global alarm. The remaining bits are designated for the message data of the signal.

In one embodiment, the Signaling Subcontroller 340 receives a 16-bit word from a system signaling module (not shown in this figure), with a SIG_REQ signal. When held in the logical high state, the SIG_REQ signal indicates the presence of a valid message. The 16-bit word is transmitted 1 bit at a time across 16 consecutive frames on Channel 0. Additionally, a Clear-to-Send signal (SIG_CTS) is disabled while the message is being transmitted. If the SIG_REQ signal is maintained in the high state after the message is transmitted, then the 16-bit word currently present on the signaling bus is immediately re-transmitted. Otherwise, when SIG_CTS signal is enabled at the end of a message transmission, the Signaling Subcontroller 340 waits for the next SIG_REQ signal transition. If the SIG_REQ signal is held low then null data (e.g., one or more zero bits) is transmitted at the signaling bit position. Hence, for a 16-bit channel, the signaling message is $\{S_0, S_1, \ldots, S_{15}\}$ on the first channel (Channel 0 ). On the other channels, dummy signaling bits of 1's are typically transmitted.

Sometimes the Transmitter 210 and Receiver 220 systems experience relative time-drifts due to variations in signal propagation conditions. Because of these relative drifts, the respective clocks of the Transmitter 210 and Receiver 220 are dynamically adjusted. This dynamic adjustment involves adjusting the link data rate to avoid eventual buffer underflow or overflow. This may be accomplished by adding more overhead bits to the frame encapsulation in addition to the frame preamble and signaling bits. The overhead bits include a stuffing bit and multiple justification bits. The stuffing bit dynamically changes from a real data bit to a stuff bit on a frame by frame basis. The justification bits typically indicate whether the stuffing bit is a real data bit or not (i.e., a dummy bit). The use of multiple justification bits allows enough Hamming distance to encode the meaning of the stuffing bit. The Transmitter 210 normally sends real data in the stuffing bit position and sets the corresponding justification code. When the Elastic Store 320 is near empty, the Transmitter 210 sends no data in the stuff position and sets the corresponding justification code. Three bits are needed for the justify bits which are designated as follows: $J_{bit\text{-}number}^{Channel\text{-}number}$. There are two possible positions for the stuffing bit:

$$\text{Stuffing-bit-pos}=1 \text{ if}(J_0^0 J_1^0 J_2^0)=111$$

$$\text{Stuffing-bit-pos}=D_0 \text{ if}(J_0^0 J_1^0 J_2^0)=000$$

where "Stuffing-bit-pos" is the stuffing bit position, and "$D_0$" is the first data bit.

Communication between the Framer 330 and the TX Elastic Store 320 is typically accomplished via a Stuff_Request (STF_REQ) signal. Upon receipt of the STF_REQ signal from the Elastic Store 320, the Framer 330 transmits a stuff bit at the next available stuffing opportunity. The three justify bits are preferably set to '111' to indicate that a stuff bit is being sent in the current frame. The stuff bit preferably occupies the first data bit position in the frame, and is coded as a '1'. The Framer 330 transmits a Stuff_Ack bit back to the Elastic Store 320 to acknowledge that the bit stuffing is complete.

In addition to the above-identified overhead bits, the Framer 330 transmits outgoing signals "transparently" in the frame payload portion by sending a Data Request (Data_Req) signal to the Elastic Store 320. The transparent characteristic of this invention refers to the communication of various signals independently from, and without affecting, the data or information contained in the signals. User data correspond to the outgoing signals as they enter into the line interface. As noted above, these outgoing signals typically conform to one or more of the following signaling schemes: DS0, T1/E1 or T3/E3. The Elastic Store 320 responds within a fixed period of time, such as ¾ of a transmit clock cycle by placing valid data into the input of the Framer 330.

Communication between the Framer 330 and the Elastic Store 320 is preferably governed by the following signaling method. If the STF_REQ signal is set to high, the Justify bits are set to "111." If the STF_REQ signal is set to low, the Justify bits are set to "000." The Framer 330 transmits the Justify bits to the Spreader 350. If the Justify bits are set to "111," the Framer 330 transmits a Stuff bit to the Spreader 350. However, if the Justify bits are set to "000," the Framer 330 sends a Data_Req signal to the Elastic Store 320 and a timer is started. The Elastic Store 320 has a predetermined fixed time to send a outgoing signals to the Framer 330. More particularly, when the justify bits are set to "000," there is no stuffing bit. Hence, the Framer 330 requests data by transmitting a Data_Req signal to the Elastic Store 320. The Elastic Store 320 has a predetermined time to reply back by allowing the framer to read the data from its output. Upon receiving the data signal, the Framer 330 forwards the data signal to the Spreader 350. The Framer 330 processes all outgoing signals in parallel on all channels.

Communication between the Framer 330 and the Spreader 350 is governed by the following signaling method. At the start transition, the Framer 330 enters an Initialize state. The Initialize state occurs after the Reset process is executed (described above). All system processes are preferably state machines and, hence, all state machines may have different states. At the initialize state, the preamble bits are typically loaded into the shift register 352 of the Spreader 350. If the Reset signal is high, then the Framer 330 enters an Active state upon receiving the Reset signal from a Timing block (not shown in this figure). The Timing block preferably controls the timing of all functional blocks in the WTS system 200. For instance, the Timing block ensures that all functional blocks enter the Start state at the same time.

Once in the Initialize state, the Framer 330 loads preamble bits into its registers to determine the logical state of the Reset signal (i.e., high or low). If the Reset signal is low, the Framer 330 enters an Active state. If the Reset signal is high, the Framer 330 enters a Wait state, during which the Framer 330 waits for a Reset signal having a low state. During the Active state, the Framer 330 sends the Preamble signal to the Spreader 350, and determines the logical state of the SIG_REQ signal. If SIG_REQ signal is high, the Framer 330 transmits the next bit in the signaling message to the Spreader 350. If the SIG_REQ signal is low, then the Framer 330 transmits no message.

Figure 6:
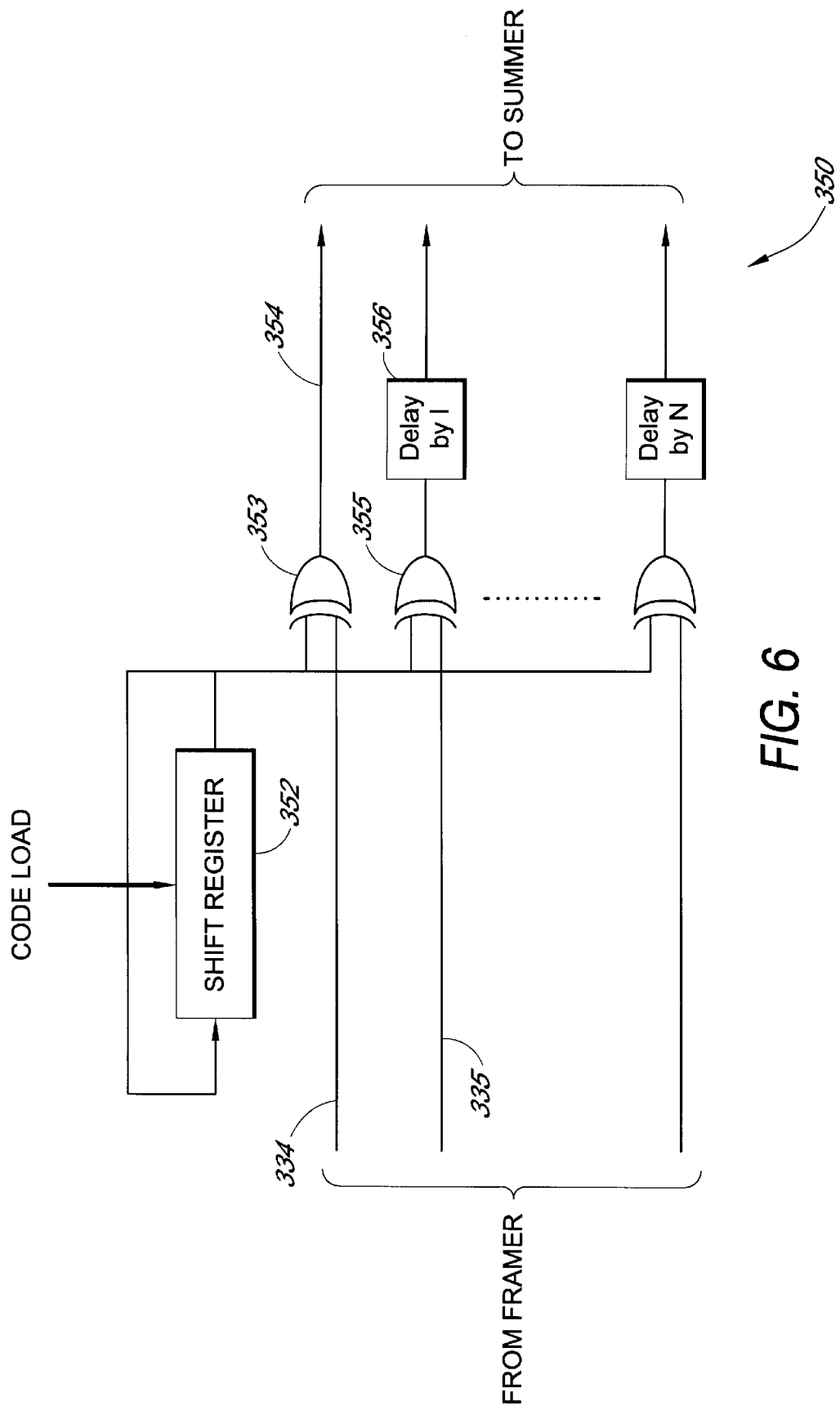
FIG. 6 is a functional block diagram of the TX Spreader as implemented in the TX Baseband system of FIG. 3.

FIG. 6 is a functional block diagram of the TX Spreader 350 as implemented in the TX Baseband system 220 of the WTS system 200 (FIG. 2). The Spreader 350 is connected between the Framer 330 and the Summer 360 (shown in FIG. 3). The Spreader 350 transmits each of the input data channels by preferably utilizing the entire bandwidth available on the RF link 180 (shown in FIG. 1). The Spreader 350 typically encodes each channel by a unique relative offset of the spreading codes. Such unique coding allows proper decoding of the individual channels by the Receive 250.

As shown in FIG. 6, the Spreader 350 comprises a shift register 352, a plurality of exclusive-OR gates (e.g., gate 353 ), and a plurality of delay blocks (e.g., block 356 ). The Spreader receives input signals over a plurality of input channels (e.g., input channel 334 ) from the Framer 330. At the first clock transition in the master clock signal (not shown), the Spreader 350 enters an Initialize state to allow the spreading code to be loaded into the shift register 352. Upon loading the spreading code, the Reset signal is set back to low, wherethen exclusive-OR gates perform logical OR operation on outgoing data streams (e.g., signal 334 ) and the spreading code 351. A single spreading code 351 is used to spread the outgoing data stream on different channels. The spread data is then shifted by an appropriate time offset. In this embodiment data streams on channel 334 is preferably not shifted in time. Incoming data on subsequent channels (e.g., channel 335), are delayed in time by 1 clock cycle. Various types of well-known spreading codes may be used to spread the incoming data at this stage. In this embodiment, the spreading code used corresponds to the following 14 bit Barker code sequence:

$$\{-1,1,-1,1,-1,1,-1,1,-1,1,-1,1,-1,1\}$$

The Spreader 350 receives incoming data over parallel channels (i.e., multiple bit streams) from the Framer 330. Typically, the shift register 352 generates the above Barker code sequence using a Chip-CLK and Reset signals. For each channel, input data are separated into 14 in-phase channels, termed I-channels and 14 quadrature channels, termed Q-channels. The Spreader 350 outputs spread data to the Summer 360. Data streams passing through the Spreader 350 may experience a half chip delay (latency) due to the processing time of the Spreader 350.

Referring back to FIG. 3, the Summer 360 is connected between the Spreader 350 and the TX Pulse Shaping Filter (PSF) 370. The Summer 360 comprises two summing circuits: a summer for I-channels and a summer for Q-channels (not shown). The Spreader 350 feeds the I-channels into the I-channel summer, and the Q-channels into the Q-channel summer. The data stream spread over these channels is first encoded as a binary number. Hence, for each set of 14 channels (14 I and 14 Q), each summer outputs 4 binary signals to sufficiently represent the summation of 14 channels ($2^4=16$). Then, the 4 binary signals are fed into a digital-to-analog converter in the TX IF system 230 for conversion from digital to analog form.

The resulting analog signals may optionally be fed into the PSF 370, or directly into the TX IF system 240 for further processing. The PSF 370 filters out most of any unwanted noise and interchip interference from the analog signals. Wider transmission bandwidth is typically required for the transmission of other signals such as those employing well-known phase encoding schemes such as BPSK or QPSK (with twice the chipping rate). The PSF 370 preferably employs a squared-root raised cosine (SRRC) filter having roll-off factors of 0.25 to 0.4. The analog signals for the I and Q channels are then mixed and upconverted by the TX IF system 230 and RF system 240 to the desired frequencies for transmission through the antenna 130.

Figure 7:
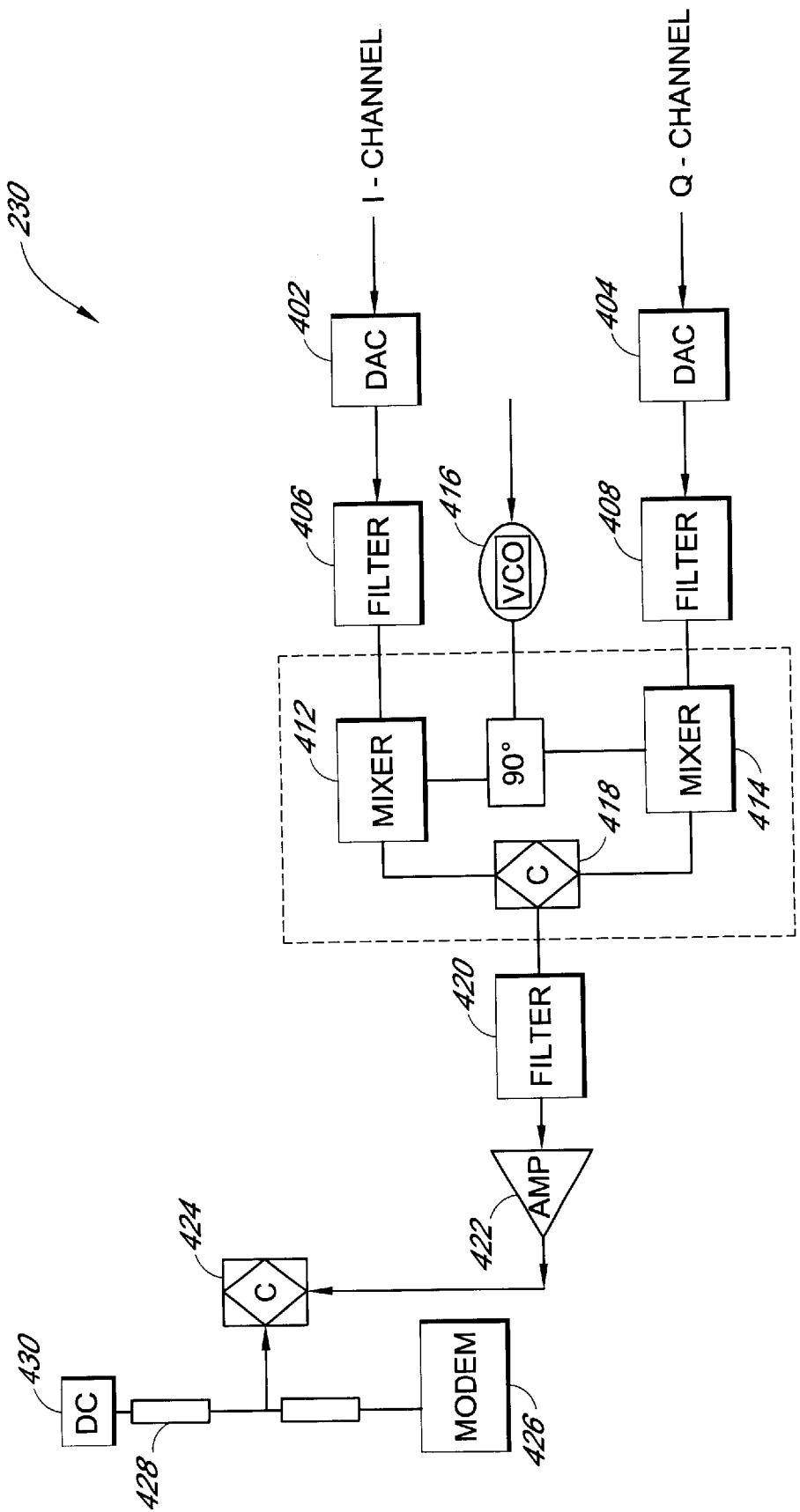
FIG. 7 is a functional block diagram of the TX IF system as implemented in the transmitter system of the WTS system of FIG. 2.

FIG. 7 is a functional block diagram of the TX IF system 230 as implemented in the Transmitter system 210 of the WTS system 200. As shown in FIG. 7, the TX IF system 230 receives outgoing signals from the TX Baseband system 220 for transmission. As noted above, the signals are preferably received over parallel channels which are preferably divided into I-channels and Q-channels. In this embodiment, the number of each set of I-channels and Q-channels may be 14 channel. For the purpose of simplicity, only one channel path is shown in FIG. 7. The I-channels are processed in parallel with the Q-channels. The I-channels and Q-channels are converted from digital to analog form using a digital-to-analog converter (DAC) 402 and a DAC 404, respectively. Then, the I-channels and Q-channels are fed into an I-filter 406 and a Q-filter 408, respectively. Each of the filters 406, 408 is preferably an anti-aliasing filter, which is a well-known component. Each of the filters 406, 408 filters out any unwanted signals which may have been introduced in the stage of digital-to-analog conversion by the DACs 402, 404.

After proper filtering, the I-channels and Q-channels are fed into a TX Modulator for modulating outgoing signals onto a carrier signal. While any one of various modulation schemes may be used (e.g., AM, FM, FSK, GMSK, PCM, BPSK, etc.), the modulator 410 preferably performs a quadrature phase shift keying (QPSK) modulation on outgoing signals. The I-channels and Q-channels are processed in parallel by feeding into an I-mixer 412 and a Q-mixer 414, respectively. Each of the mixers 412 and 414 is preferably a quadrature mixer having a Δ-phase offset of about 2° and a Δ-amplitude offset of about 0.2 dB. The phase shift used in this embodiment is typically about 90°. A local oscillator such as a voltage controlled oscillator (VCO) 416 is used to modulate outgoing signals into the desired carrier frequency. The VCO 416 may have a frequency characteristic of about 310 MHz+/−50 ppm. Output signals of the mixing stage are combined by a TX Combiner 418. The output signals from the TX Combiner 418 are fed into a TX Filter 420. The TX Filter 420 filters out any image rejection generated at the mixing stage by the VCO 416. The outgoing signals are then fed into a TX Amplifier 422 for amplification. The amplifier 422 is preferably a RF-type amplifier which provides substantially flat gain across a bandwidth that is wider than that of the outgoing signal. The amplified signals are then fed into a Combiner 424 which optionally delivers outgoing signals to a Modem 426, or to the TX RF system 250 via a coaxial cable 428 for further processing. The coaxial cable 428 is preferably a non-radiating RF cable allowing signal transmission with minimal signal power loss. A DC power supply 430 is provided to support signal transmission via the coaxial cable 428. The modem 426 may be a FSK modem, but other types of modem designed for optimal transmission may be used to communicate the signals to an alternate destination.

Figure 8:
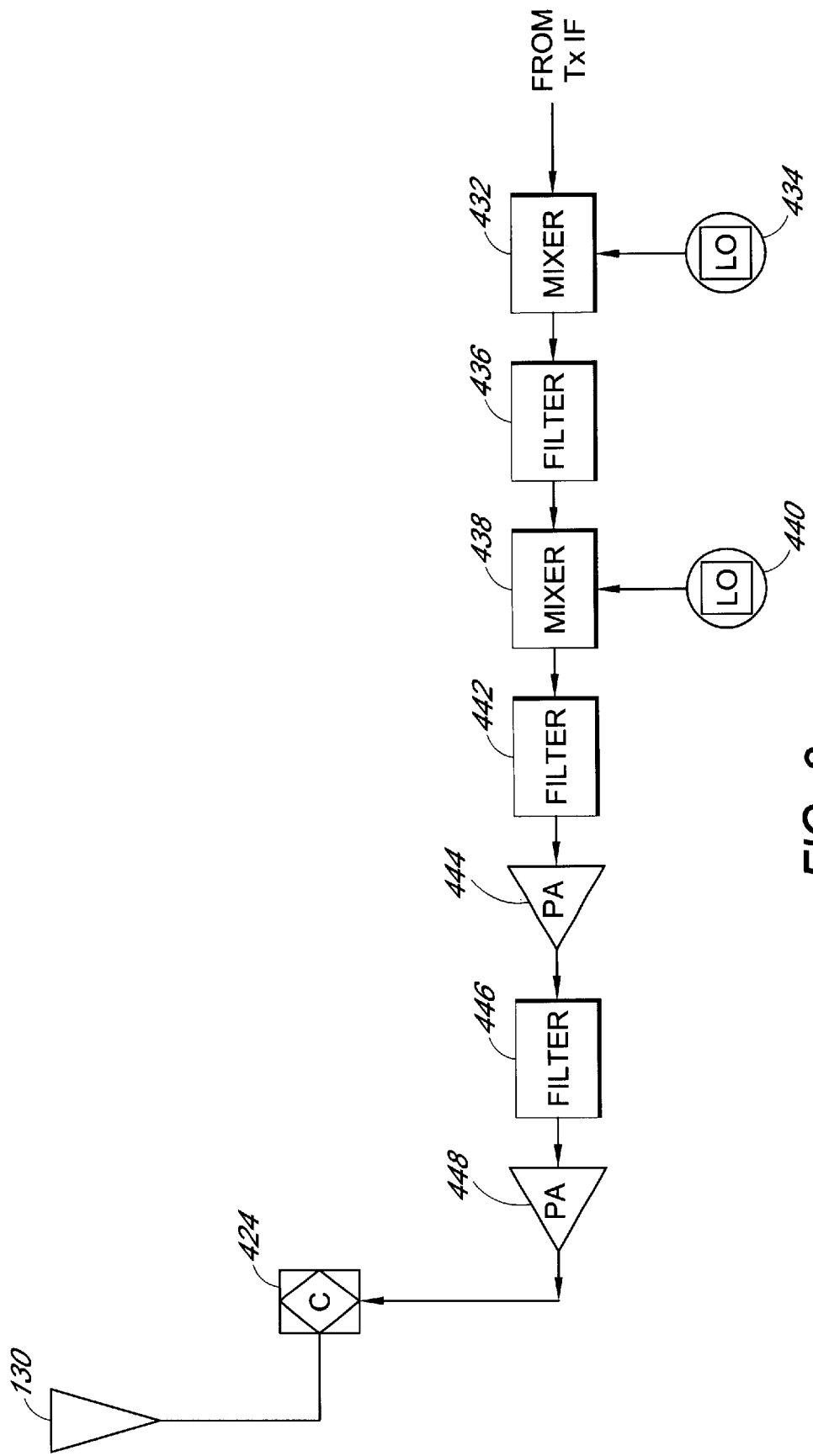
FIG. 8 is a functional block diagram of the TX RF system as implemented in the transmitter system of the WTS system of FIG. 2.

FIG. 8 is a functional block diagram of the TX RF system 240 as implemented in the Transmitter system 210 of the WTS system 200 (FIG. 2). As noted above, the TX RF system 240 receives outgoing signals from the TX IF system 230 via the coaxial cable 428 for transmission. As shown in FIG. 8, the coaxial cable feeds outgoing signals into a first Mixer 432 which is connected to and controlled by a local oscillator 434. The first Mixer 432, which may be an off-the-shelf component, mixes the outgoing signals and feeds them into a first Filter 436. The first Filter 436 is preferably a well-known LC/SAW filter which removes unwanted signal components from the outgoing signals. The first Filter 436 feeds outgoing signals into a second Mixer 438 which is connected to and controlled by a local oscillator 440. The outgoing signals are further mixed to achieve the frequency in the desired RF band for transmission by the antenna 130. The second Mixer 438 feeds outgoing signals into a second Filter 442 to again remove any unwanted signal components introduced by the second mixing stage. The second Filter 442 is preferably a LC/SAW filter. The second Filter 442 feeds the outgoing signals into a first power amplifier (PA) 444 for amplification. The first PA 444 is preferably one of a number of commercially available standard RF power amplifiers. The first PA 444 feeds the outgoing signals into a third Filter 446 to remove any unwanted signal components introduced by the first PA 444. In this embodiment, one or more amplification stages may be required. Hence, the third Filter 446 feeds outgoing signals into a second PA 448. The resulting signal is then passed through a Circulator 450 for transmission via the antenna 130.

4. Receiver of the Wireless Transceiver System

Figure 9:
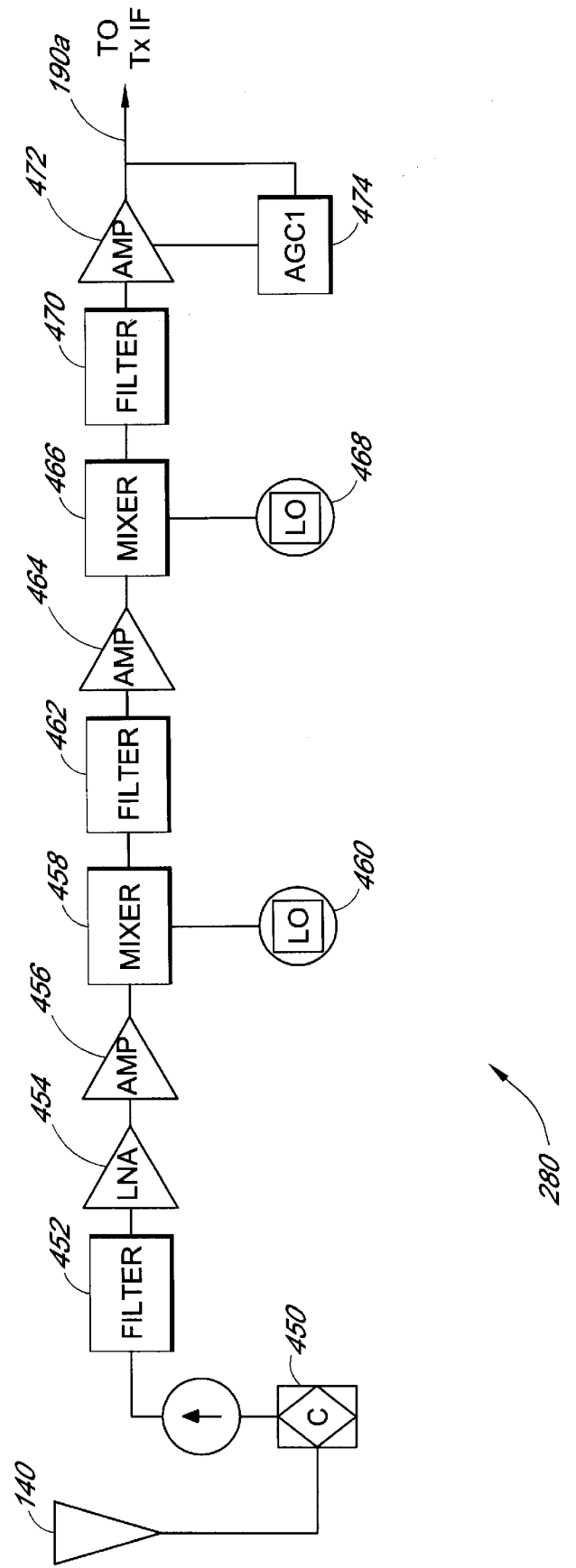
FIG. 9 is a functional block diagram of the RX RF system as implemented in the RX system of the WTS system of FIG. 2.

At the receiving end (e.g., a DWTS), a receiving antenna receives the transmitted signals (e.g., antenna 140 of FIG. 1) into the RX RF system 280. FIG. 9 is a functional block diagram of the RX RF system 280 as implemented in the Receiver system 250 of the WTS system 200. As noted above, the RX RF system 280 receives incoming signals from another WTS system 200 via the antenna 140. As shown in FIG. 9, an incoming signal is first fed into the Circulator 450 which delivers the signal to a first Filter 452. The first Filter 452 is preferably a cavity filter which removes any unwanted signal components from the incoming signal. The first Filter 452 feeds the filtered signal into a Low Noise Amplifier (LNA) 454 for amplification. The LNA 454 amplifies the filtered signal and feeds it into a first Amplifier 456 for further amplification. The first Amplifier 456 is one of a number of commercially available standard RF receive amplifiers. The first Amplifier 456 amplifies the incoming signal and feeds it into a first Mixer 458. The first Mixer 458 is controlled by a local oscillator 460 for downconverting the frequency of the incoming signal into a desired frequency. The first Mixer 458 feeds the downconverted signal to a second Filter 462 for further filtering. The second Filter 462 is preferably a well-known LC/SAW filter which removes any unwanted signal components from the downconverted signal. The filtered signal is then fed into a second Amplifier 464 for further amplification. The amplified signal is fed into a second Mixer 466 is controlled by a local oscillator 468 for further downconverting the frequency of the incoming signal into the desired frequency. The second Mixer 466 feeds the downconverted signal to a third Filter 470 for further filtering. The third Filter 470 is preferably a well-known LC/SAW filter which removes any unwanted signal components from the downconverted signal. The filtered signal is then fed into a third Amplifier 472 for further amplification. The third Amplifier 472 is preferably controlled by an AGC circuit 474 for adequately adjusting the power of the incoming signal. The incoming signal is fed into the RF IF system 270 via the RF cable 428 (shown in FIG. 10) for further processing. The double-conversion receiver approach described above allows utilization of cost-efficient signal sources, and ensures an improved image rejection in the RF section.

Figure 10:
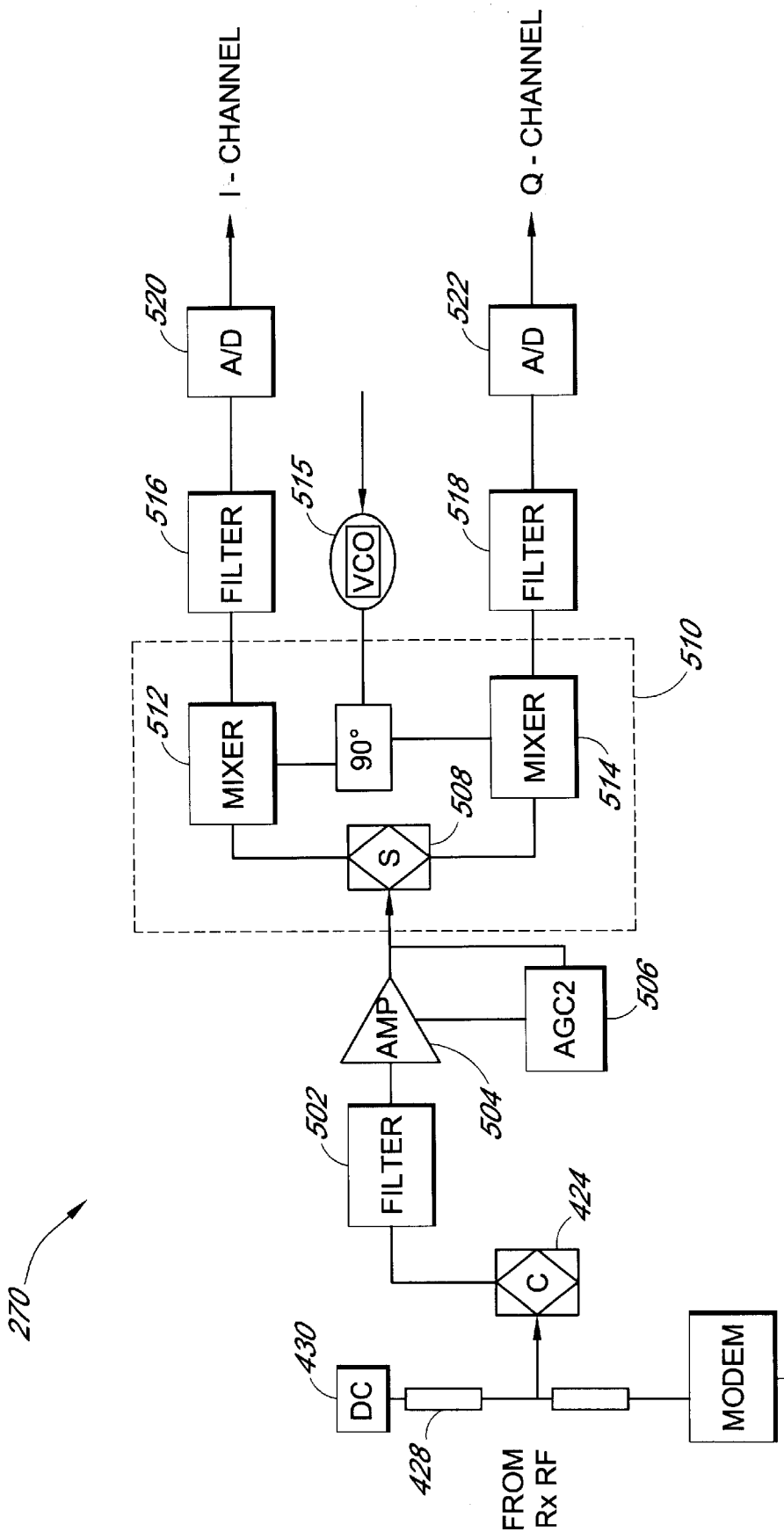
FIG. 10 is a functional block diagram of the RX IF system as implemented in the RX system of the WTS system of FIG. 2.

FIG. 10 is a functional block diagram of the RX IF system 270 as implemented in the Receiver system 250 of the WTS system 200. As shown in FIG. 10, incoming signals are received by the Combiner 424 from the RX RF system 280 via the coaxial cable 428. Alternatively, the incoming signals may be transmitted to other destinations via the modem 426. The Combiner 424 feeds incoming signals into a RX Filter 502. The RX Filter 502 filters out unwanted noise which may, for instance, have been introduced at the RF stage. The characteristics of the RX Filter 502 are similar to that of the RX Filter 420 (shown in FIG. 7). Output signals from the RX Filter 502 are fed into a RX Amplifier 504 for amplifying the signal to an adequate power level for processing. The characteristics of the RX Amplifier 504 are similar to that of the TX Amplifier 420 (FIG. 7). The RX Amplifier 504 preferably provides a flat gain over a bandwidth that is wider than that of the incoming signals. The output of the amplifier 504 is monitored by an automatic gain control (AGC) module 506. The AGC module 506 preferably provides 20 dB of dynamic gain to compensate for variations in signal power due to various path impedance losses, e.g., a loss due to variations in the length of the coaxial cable 428.

The RX Amplifier 504 feeds the incoming signals into a RX Demodulator 510 for demodulating the data signals from the carrier signal. The demodulator 504 employs the modulation scheme corresponding to that applied in the transmit stage, e.g., QPSK demodulation scheme. A signal Splitter 508 provides parallel incoming signal streams for later mixing into a set of I-channels and a set of Q-channels. In this embodiment, the Splitter 508 outputs 14 I-channels and 14 Q-channels into an I-mixer 512 and a Q-mixer 514, respectively. Each of the I-mixer 512 and Q-mixer 514 is preferably a quadrature mixer having a A-phase offset of about 2° and a Δ-amplitude offset of about 0.2 dB. A local oscillator (VCO) 515 is used to provide the necessary signals for mixing incoming signals to the desired frequency. The characteristics of the VCO 515 is preferably substantially similar to that of the local oscillator VCO 416 (shown in FIG. 7) employed in the transmit stage. The RX Demodulator 510 outputs the I-channels and Q-channels of the incoming signals into an I-filter 516 and a Q-filter 518, respectively. Each of the I-filter 516 and Q-filter 518 is preferably an anti-aliasing filter, which is well-known and commercially available. Each of the I-filter 516 and Q-filter 518 filters out any unwanted signals which may have been introduced by the demodulator 510 in the mixing stage. The output of each of the I-filter 516 and Q-filter 518 is fed into an analog-to-digital converter (ADC) 520 and ADC 522, respectively. Each of the ADCs 520, 522 samples and digitizes the incoming signals for further processing by the RX Baseband system 260.

Figure 11:
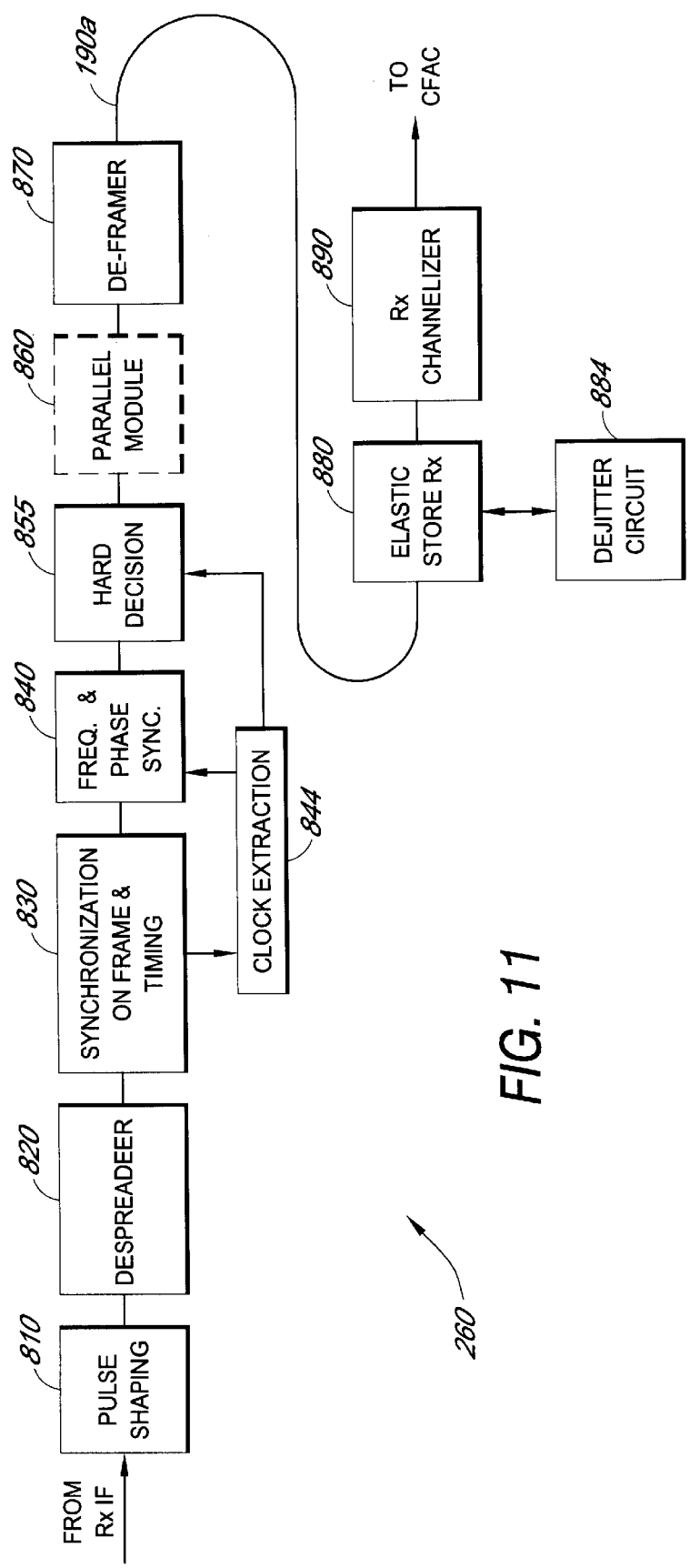
FIG. 11 is a functional block diagram of the RX Baseband system as implemented in the RX system of the WTS system of FIG. 2.

FIG. 11 is a functional block diagram of the RX Baseband system 260 as implemented in the Receiver system 250 of the WTS system 200 (FIG. 2). The Baseband system 260 comprises a RX Pulse Shaping Filter (PSF) 810 which is connected to a Despreader 820. The RX PSF 810 preferably receives direct incoming signals from the RX IF system 270. The Despreader 820 despreads incoming signals and substantially eliminates associated sidelobes and inter-user interference. The output of the Despreader 820 is preferably in the form of TDMA signals. A first Synchronizer 830 is connected to the output of the Despreader 820 for receiving the TDMA signals. The first Synchronizer 830 preferably performs two operations, mainly frame and timing synchronization of the incoming signals. A second Synchronizer 840 is connected to the output of the first Synchronizer 830. The second Synchronizer 840 preferably performs two operations, mainly frequency and phase synchronization of the incoming signals. A Clock Extraction circuit 844 is coupled to the first and second synchronizers 830 and 840 to extract a timing synchronization signal from the incoming signals. A Hard Decision (HD) Module 850 is connected to the output of the second Synchronizer 840. The HD module performs hard decision operations on incoming signals. The HD Module 850 also receives control signals from the Clock Extraction circuit 844. In turn, the Deframer 870 writes the data streams for storage in a RX Elastic Store 880. A Dejitter Circuit 884 preferably regulates signal flow through the Elastic Store 880 by removing phase offsets. Finally, a RX Channelizer 890 may be used to reconstruct the original standardized signals, e.g., from T1 signals to a single T3 signal.

The following are further details on the individual components of the RX Baseband system 260. Referring now to the RX PSF 810, when incoming signals are fed into the RX PSF 810 for processing, the PSF 810 communicates the received signals to the Despreader 820. The RX PSF 810 is matched to the TX PSF 370 to provide optimal performance in the presence of additive white Gaussian noise (AWGN) associated with the communication channel. Additionally, the combination of the outputs of both TX and RX pulse shaping filter is preferably a Nyquist pulse. More particularly, when the signal pulse is sampled, it has minimal inter-symbol interference (ISI), and preferably zero ISI.

Figure 12:
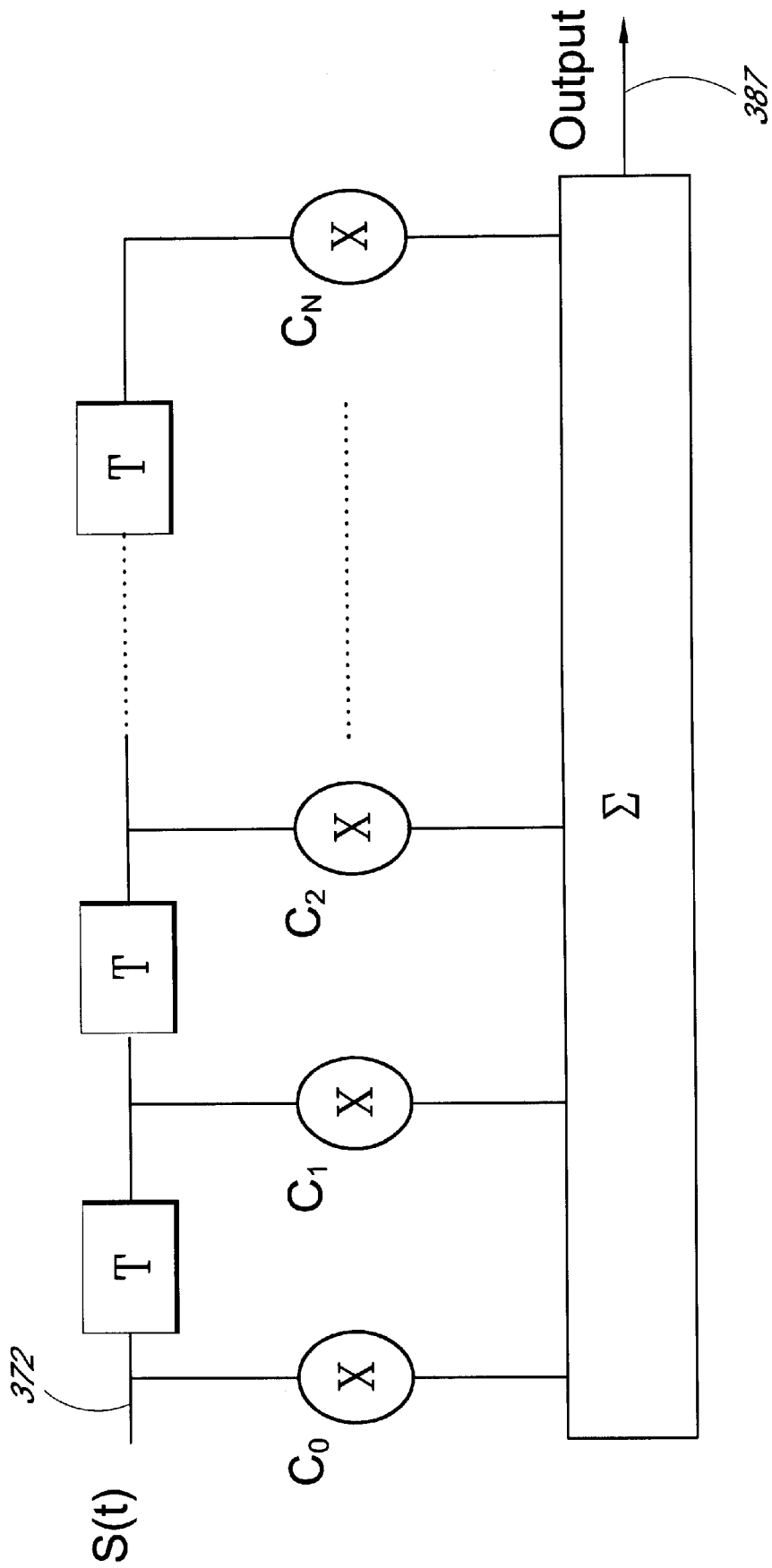
FIG. 12 is a functional block diagram of the RX Sidelobe Suppression Filter as implemented in the RX Baseband system of FIG. 11.

The Despreader 820 comprises a PN matched filter (PNMF) (not shown) and a sidelobe suppression filter (SSF) 814 shown in block diagram form in FIG. 12. The PNMF despreads the signal in accordance with the same PN code used in the Spreader 350 (FIG. 3) of the transmit stage to recover the original signal. The processing of the incoming signals by the PNMF may produce sidelobe and inter-user interference. The output of PNMF is fed into the SSF to eliminate or minimize the foregoing interference. As shown in FIG. 12, the SSF is preferably designed using distributed arithmetic. An analog signal S(t) 372 is the input to the SSF having N coefficients $C_0$–$C_N$. A symbol rate T is divided by 2 for all the filters in the system. In one embodiment, the SSF 814 is preferably sensitive to signal powers having approximately less than –50 dB. The output of the SSF 814 is preferably in the form of TDMA signals along the output signal line 378.

As shown in FIG. 11, the output of the Despreader 820 is fed into the first Synchronizer 830. The first Synchronizer 830 establishes timing recovery by detecting the preamble of a frame. The first Synchronizer 830 de-multiplexes the incoming signal into parallel channels, and separates the overhead bits which were added to the data of the incoming signals at the transmit stage. Furthermore, the first Synchronizer 830 extracts timing information and other information required by subsequent data detection units (e.g., frame synchronization, phase and frequency offset). The first Synchronizer 830 samples the signal at about one sample per bit rate. The first Synchronizer 830 employs a filter matched to a unique code sequence of the spreading code ("unique word") to perform frame synchronization. The filter is functionally part of the frame synchronization block. When real and complex modulation schemes (such as BPSK and QPSK) are used to modulate incoming signals, the unique word (on the real and imaginary elements) for the incoming data stream is substantially identical. Using an identical unique word allows implementing the matched filter without the use of multiplication operations. Instead, the matched filter can be implemented with simple addition and subtraction operations.

The frame is typically detected in the Synchronizer 830 by an initial phase and frequency offsets elimination. By doing so, a considerable reduction in the effect of frequency and phase offsets is achieved. This preferably results in a frequency offset that is much smaller than the data rate. This process is accomplished by determining the magnitude of the complex signal component (real and imaginary elements), or signal magnitude squared, of the frame synchronization filter's output. Then the resulting magnitude is preferably passed through a threshold detector. The threshold detector is preferably set high enough to detect the frame synchronization spike. Incoming signals are also fed simultaneously into a comparator (not shown) which detects the samples of the matched filter's output with a positive slope. The threshold value is preferably set high enough to cope with the reduction in the correlation spike due to the presence of phase and frequency offsets. The threshold value is also preferably set sufficiently low so that an average of 3 samples pass the threshold detector (not shown). Furthermore, isolating the output of the comparator may be necessary. For this purpose, the outputs of the threshold detector and the comparator are logically "ANDed" at the synchronization spike. The AND operation preferably retains only the rising samples from the output of the threshold detector. However, since the output of the AND operation may not be an impulse, additional logic may be used to isolate the maximum of the threshold output. The frame synchronization spike (i.e., peak) represents the location of the final sample of the unique word.

When the Synchronizer 830 is synchronizing frequency and phase of incoming signals, data is detected at a previous time interval having a length L. Selecting the length L depends upon balancing between statistical accuracy (e.g., noise rejection) and tracking the variations in signal frequency and phase offsets. In other words, the values of coefficients for the unique word, e.g., $a_{K-1}, \ldots, a_{K-L}$ are known. To estimate and synchronize signal phase and frequency, the known data stream (already sent as overhead bits in the transmit stage) is used to improve the estimation of the residual phase offset. The effect of this known data sequence is removed by multiplying it with its complex conjugate. The remaining signal over this interval are averaged to estimate the joint phase and frequency offsets. Using the estimated phase and frequency at one time-step ahead (i.e., time $K * T_c$), the subsequent data stream is detected by removing the effect of phase and frequency offsets (i.e., de-rotation). The process continues until the end of the data packet is reached. The de-rotated data is then fed into the HD module 855.

Figure 13:
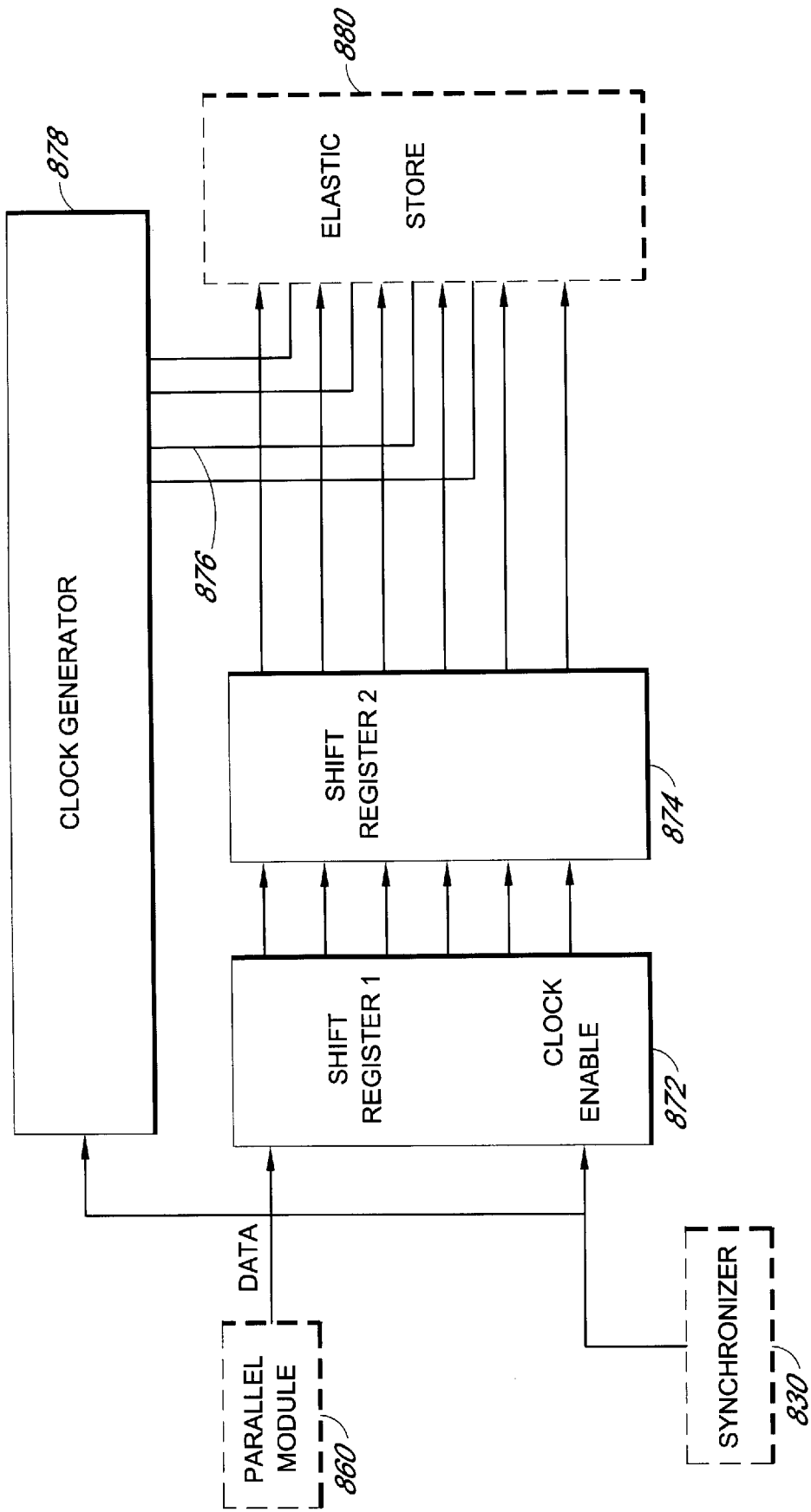
FIG. 13 is a functional block diagram of the RX Deframer as implemented in the RX Baseband system of FIG. 11.

As noted above, the output of the HD Module 850 is fed into a Parallel Module 860 to convert incoming data streams from a single channel into 28 parallel channels. The Deframer 870 receives the incoming signals from the Parallel Module 860 for further processing. FIG. 13 shows a functional block diagram of the Deframer 870 as implemented in the RX Baseband system 260. The Deframer 870 strips out any extra-bits added to the data signal stream during the transmit stage. Typically, the Synchronizer 840 sends a "read" clock signal to the Deframer 870. The Deframer 870 strips out the extra-bits added to the incoming signals at the transmit stage. As shown in FIG. 13, the Deframer 870 comprises two shift registers 872, 874 and a Clock Generator 878. The shift register 872 clocks in the input data streams at the "read" clock rate. The shift register 874 preferably functions as a frame buffer for each of the parallel channels. The shift register 874 buffers incoming data signals for a single clock cycle. The Clock Generator 878 generates associated write clock signals 876 for each of the parallel channels to write data into the Elastic Store 880. More particularly, the shift register 874 decodes justification bits from the data signals by inserting one or more stuffing bits into the Elastic Store 880 as data bits. In one embodiment, bit stuffing is performed when justification its are set to "000." When justification bits are set to "111," insertion of stuffing bits is preferably ignored, and the write signal of the clock generator 878 which performs a write operation to the Elastic Store 880 is suppressed. The Deframer 870 then transmits the processed data streams to the corresponding RX Elastic Store 880 on each channel, e.g., there are 28 elastic stores for processing each of the 28 channels.

The Elastic Store 880 is connected to the output of the Deframer 870 to receive the incoming data signals therefrom for further processing. The Elastic Store 880 comprises a shift register which stores data signals incoming from the Deframer 870. The Elastic Store 880 is preferably a shift register which employs a Dejitter Circuit 884 to buffer data signals and maintain synchronization between transmit and receive clock frequencies. The Dejitter Circuit 884 typically controls underflow and overflow status of the RX Elastic Store 880. If the Dejitter Circuit 884 detects an underflow or overflow status, the Dejitter Circuit 884 transmits an alarm signal to the RX Elastic Store 880. As a result, the Dejitter Circuit 884 adjusts its read operation by speeding up or slowing down data flow from the Elastic Store 880, depending on the rate of the incoming data stream. The output of the RX Elastic Store 880 is then fed into a RX Channelizer 890.

Figure 14:
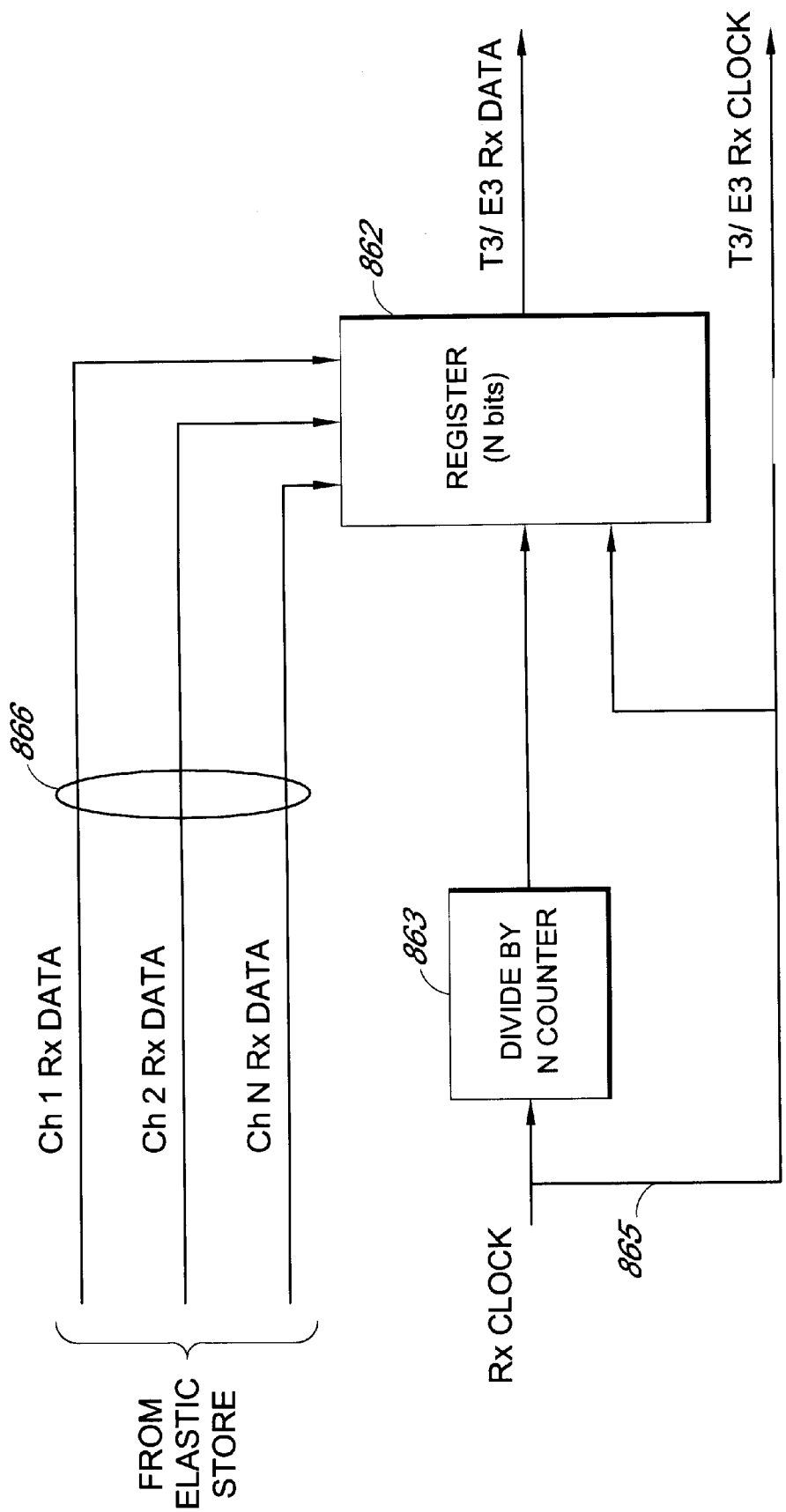
FIG. 14 is a functional block diagram of the RX Channelizer as implemented in the RX Baseband system of FIG. 11.

The RX Channelizer 890 receives output signals from the RX Elastic Store 880. FIG. 14 is a functional block diagram of the RX Channelizer 890. In the receive mode, T3/E3 output is desired, the Channelizer 890 constructs T3/E3 data from N receive data streams. The RX Channelizer 890 comprises an N-bit Register 862 and a Counter 864. The RX Channelizer 890 receives N data channels 866 from the Deframer 870 into the Register 862. The RX Channelizer 890 constructs T3/E3 data from the N channels 866 containing RX packet data. The Counter 863 clocks the N channels 866 into the register by an input RX clock 865 divided by N. Typically, at the start transition, the Channelizer 890 receives a Select signal (not shown in this figure) from the system controller (not shown in this figure). The system controller is at the micro-controller level. Therefore, it controls substantially all operations of each functional block of the system. The inputted data (multiple T1's/E1's) to the RX Channelizer can either be sent out as multiple T1/E1's or multiplexed as a single T3/E3 channel.

In view of the foregoing, it will be appreciated that the present invention overcomes the long-standing need for a system for communicating standardized telephonic signals (e.g., DS0/E0, T1/E1, T2/E2, and T3/E3) over the RF spectrum including the PCS, NII, and ISM bands. As described above, the system selectively applies intelligent access techniques such as CDMA and/or TDMA to support communication for a variety of input signaling schemes and data rates. The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A communication system providing communication of radio frequency (RF) signals, the system comprising:
a local wireless station, located at a local site, receiving signals having a standardized telephonic signaling scheme including a plurality of frames from a local communications facility, converting the standardized telephonic signaling scheme to a RF signaling scheme, and transmitting RF signals having the RE signaling scheme, wherein the RF signaling scheme includes a multiplexed signal access protocol, and wherein the local wireless station includes a framing process which processes the signals transparently by adding framing data to the plurality of frames prior to transmission; and
a distant wireless station, located at a distant site, receiving the RF signals from the local wireless station, and converting the RF signaling scheme to the standardized telephonic signaling scheme.

2. The system as defined in claim 1, wherein the multiplexed signal access protocol comprises a TDMA technique.

3. The system as defined in claim 1, wherein the multiplexed signal access protocol comprises a CDMA technique.

4. The system as defined in claim 1, wherein the standardized telephonic signaling scheme is selected from the group consisting of DS0, E0, T1, E1, T2, E2, T3, and E3.

5. The system as defined in claim 1, wherein the RF signals have a frequency selected from the group consisting of the PCS, ISM, NII, and cellular frequency bands.

6. The system as defined in claim 1, wherein the local wireless station includes a TX Baseband system, a TX IF system, and a TX RF system.

7. The system as defined in claim 1, wherein the distant wireless station forwards the signals having the standardized telephonic signaling scheme to a distant communication facility.

8. The system as defined in claim 7, wherein the distant wireless station additionally comprises receiving signals having the standardized telephonic signaling scheme from the distant communication facility.

9. The system as defined in claim 8, wherein the distant wireless station additionally comprises converting the standardized telephonic signaling scheme to a RF signaling scheme, and transmitting RF signals having the RF signaling scheme to the local wireless station.

10. The system as defined in claim 9, wherein the local wireless station additionally comprises converting the RF signaling scheme to the standardized telephonic signaling scheme, and forwarding the signals having the standardized telephonic signaling scheme to the local communication facility.

11. The system as defined in claim 10, wherein the local wireless station includes a RX RF system, a RX IF system, and a RX Baseband system.

12. A communication system providing communication of radio frequency (RF) signals, the system comprising:

- a local wireless station, located at a local site, receiving signals having a standard signaling scheme including a plurality of frames from a local communications facility, converting the standard signaling scheme to a RF signaling scheme, and transmitting RF signals having the RF signaling scheme, wherein the RF signaling scheme includes a signal access protocol and wherein the local wireless station includes a framing process which processes the signals transparently by adding adding data to the plurality of frames prior to transmission; and
- a distant wireless station, located at a local site, receiving the RF signals from the local wireless station, and converting the RF signaling scheme to the standard signaling scheme.

13. The system as defined in claim 12, wherein the signal access protocol includes a TDMA technique.

14. The system as defined in claim 12, wherein the signal access protocol includes a CDMA technique.

15. The system as defined in claim 12, wherein the standard signaling scheme includes Ethernet.

16. The system as defined in claim 12, wherein the RF signals have a frequency selected from the group consisting of the PCS, ISM, NII, and cellular frequency bands.

17. The communication system of claim 1, wherein the local site is connected to a local communication facility by a link.

18. The communication system of claim 17, wherein the link is an RF link.

19. The communication system of claim 17, wherein the link is a hardwired link.

20. The communication system of claim 12, wherein the distant site is connected to a distant communication facility by a link.

21. The communication system of claim 20, wherein the link is an RF link.

22. The communication system of claim 21, wherein the link is a hardwired link.

* * * * *

UNITED STATES PATENT AND TRADEMARK OFFICE
CERTIFICATE OF CORRECTION

PATENT NO. : 6,373,827 B1
DATED : April 16, 2002
INVENTOR(S) : Tayebi et al.

It is certified that error appears in the above-identified patent and that said Letters Patent is hereby corrected as shown below:

<u>Column 19,</u>
Line 17, "local", should read -- distant --

Signed and Sealed this

Fifth Day of August, 2003

JAMES E. ROGAN
*Director of the United States Patent and Trademark Office*